(12) United States Patent
Raskar et al.

(10) Patent No.: US 8,912,918 B2
(45) Date of Patent: Dec. 16, 2014

(54) METHOD AND SYSTEM FOR OPTIMIZED MONITORING AND IDENTIFICATION OF ADVANCED METERING INFRASTRUCTURE DEVICE COMMUNICATION FAILURES

(71) Applicant: Cognizant Technology Solutions India Pvt. Ltd., Chennai (IN)

(72) Inventors: Hemant Raskar, Pune (IN); Ashutosh Kavathekar, Aundh (IN)

(73) Assignee: Cognizant Technology Solutions India Pvt. Ltd. (IN)

( * ) Notice: Subject to any disclaimer, the term of this patent is extended or adjusted under 35 U.S.C. 154(b) by 147 days.

(21) Appl. No.: 13/800,165

(22) Filed: Mar. 13, 2013

(65) Prior Publication Data

US 2014/0203948 A1     Jul. 24, 2014

(30) Foreign Application Priority Data

Jan. 21, 2013   (IN) .............................. 277/CHE/2013

(51) Int. Cl.
| | | |
|---|---|---|
| G08C 19/16 | (2006.01) | |
| G08B 23/00 | (2006.01) | |
| G08C 15/06 | (2006.01) | |
| H04L 1/00 | (2006.01) | |

(52) U.S. Cl.
CPC ........................................ H04L 1/00 (2013.01)
USPC ............ 340/870.02; 340/870.03; 340/870.05; 700/295; 700/292; 700/286

(58) Field of Classification Search
USPC ........... 340/870.02, 870.03, 870.25; 700/295, 700/20, 62, 83, 292, 286
See application file for complete search history.

(56) References Cited

U.S. PATENT DOCUMENTS

| | | | | |
|---|---|---|---|---|
| 8,188,883 B2 * | 5/2012 | Martin | ...................... | 340/870.02 |
| 8,234,017 B2 * | 7/2012 | Ahn | ............................... | 700/295 |
| 8,248,269 B1 * | 8/2012 | Boyd et al. | ............... | 340/870.03 |
| 8,462,641 B2 * | 6/2013 | Ree et al. | ....................... | 370/242 |
| 8,600,556 B2 * | 12/2013 | Nesler et al. | ................... | 700/275 |
| 8,769,085 B2 * | 7/2014 | Beeco et al. | .................. | 709/224 |
| 8,799,510 B2 * | 8/2014 | Vasseur et al. | ................ | 709/239 |
| 2009/0198384 A1 * | 8/2009 | Ahn | ............................... | 700/292 |
| 2009/0222828 A1 * | 9/2009 | Lefevre et al. | ................ | 718/102 |
| 2010/0152910 A1 * | 6/2010 | Taft | ............................... | 700/286 |
| 2010/0188263 A1 * | 7/2010 | Cornwall et al. | ......... | 340/870.03 |
| 2012/0173252 A1 * | 7/2012 | Mak et al. | ....................... | 705/1.1 |
| 2012/0242499 A1 * | 9/2012 | Ree | .......................... | 340/870.02 |
| 2012/0243421 A1 * | 9/2012 | Ree et al. | ....................... | 370/242 |
| 2013/0027219 A1 * | 1/2013 | Myoung et al. | .......... | 340/870.03 |
| 2013/0066570 A1 * | 3/2013 | Sfaelos | ........................... | 702/62 |

(Continued)

Primary Examiner — Hoi Lau
(74) Attorney, Agent, or Firm — Lerner, David, Littenberg, Krumholz & Mentlik, LLP

(57) ABSTRACT

A method for optimized monitoring and identification of AMI device communication failures in an AMI network is provided. A graphical representation of AMI devices is generated comprising nodes corresponding to AMI devices and links representing connectivity between AMI devices. The graphical representation is generated based on data associated with AMI devices retrieved via AMI network in real time. Further, properties of the AMI devices are computed using the graphical representation based on values associated with the nodes corresponding to the AMI devices. The graphical representation is modified based on the computed properties and predefined rules. Nodes in the modified graphical representation are selected and processed in an order based on AMI device hierarchy, priority and criticality. Further, the graphical representation is modified based on processing of selected nodes. AMI device with communication failures are identified from at least one of the generated and modified graphical representation of AMI devices.

24 Claims, 19 Drawing Sheets

(56) References Cited

U.S. PATENT DOCUMENTS

| | | | |
|---|---|---|---|
| 2013/0204452 A1* | 8/2013 | Yamaguchi et al. | 700/292 |
| 2013/0285835 A1* | 10/2013 | Kim et al. | 340/870.02 |
| 2013/0293390 A1* | 11/2013 | Le Buhan et al. | 340/870.02 |
| 2014/0028463 A1* | 1/2014 | Chamarti et al. | 340/870.02 |
| 2014/0028469 A1* | 1/2014 | Ali et al. | 340/870.03 |
| 2014/0028470 A1* | 1/2014 | Ali et al. | 340/870.03 |
| 2014/0156097 A1* | 6/2014 | Nesler et al. | 700/295 |
| 2014/0197966 A1* | 7/2014 | Kim et al. | 340/870.25 |
| 2014/0204799 A1* | 7/2014 | Pietrowicz et al. | 370/254 |

* cited by examiner

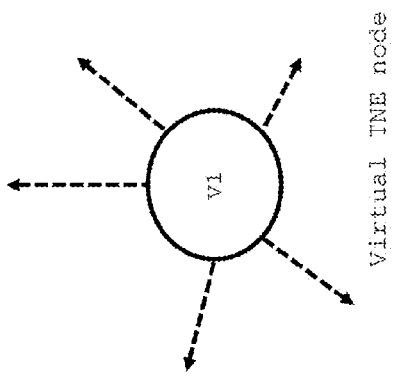
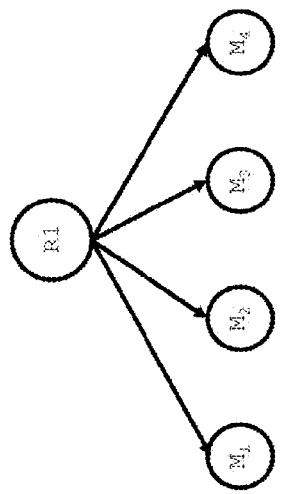
FIG. 2A Virtual TNE node
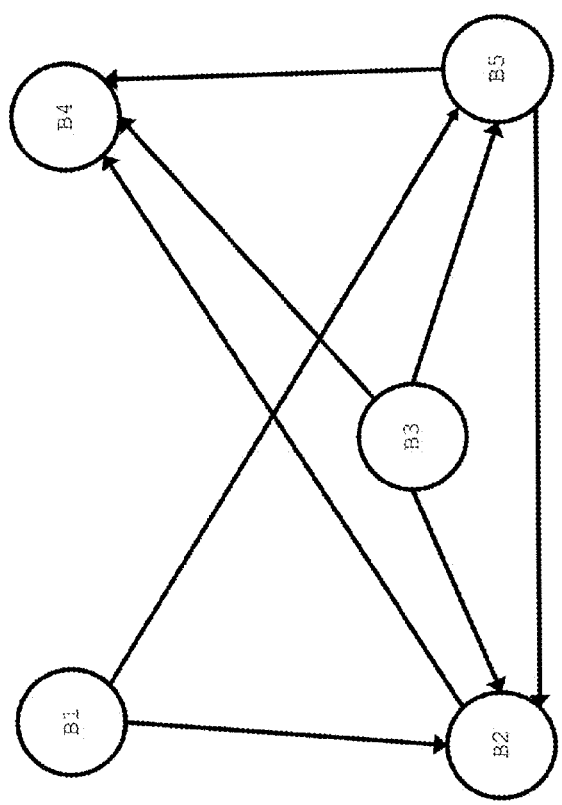
FIG. 2B Modified Directed graph of AMI network

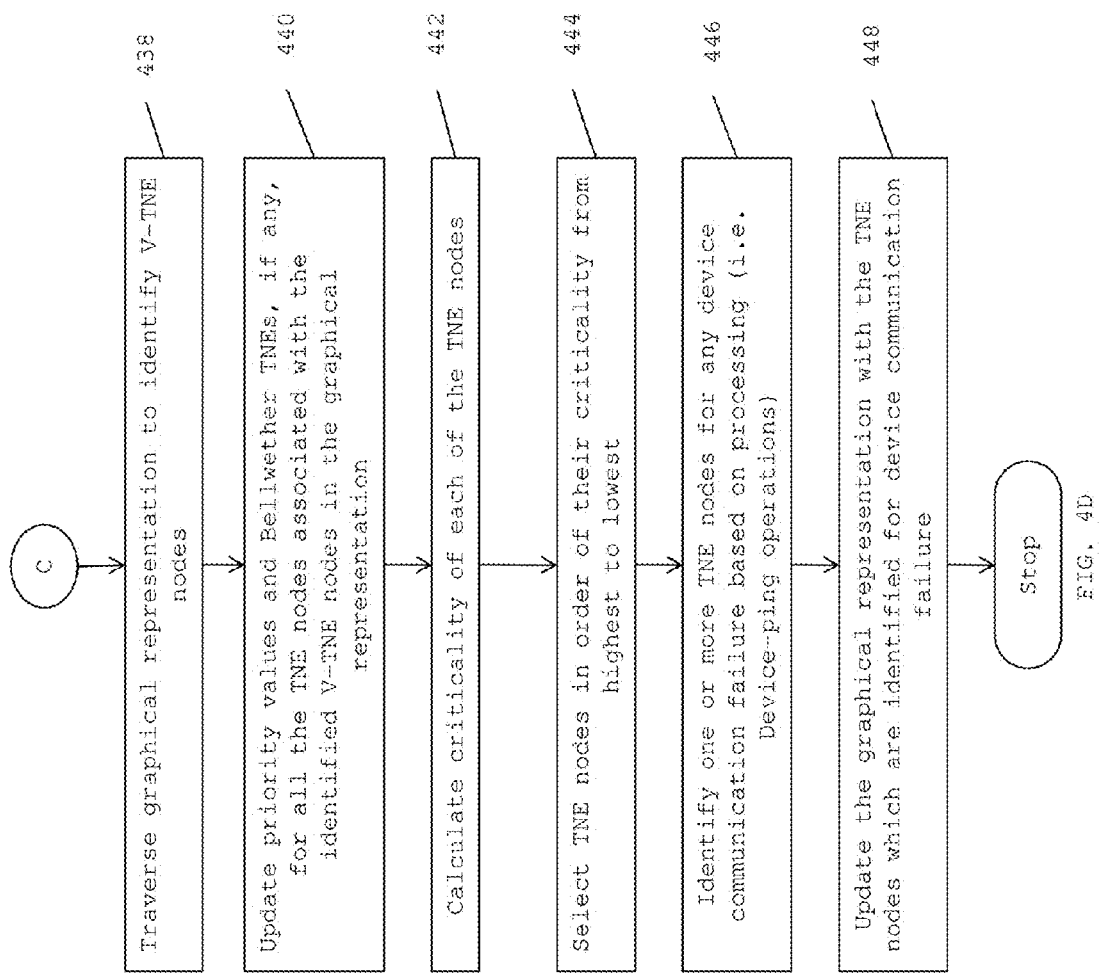

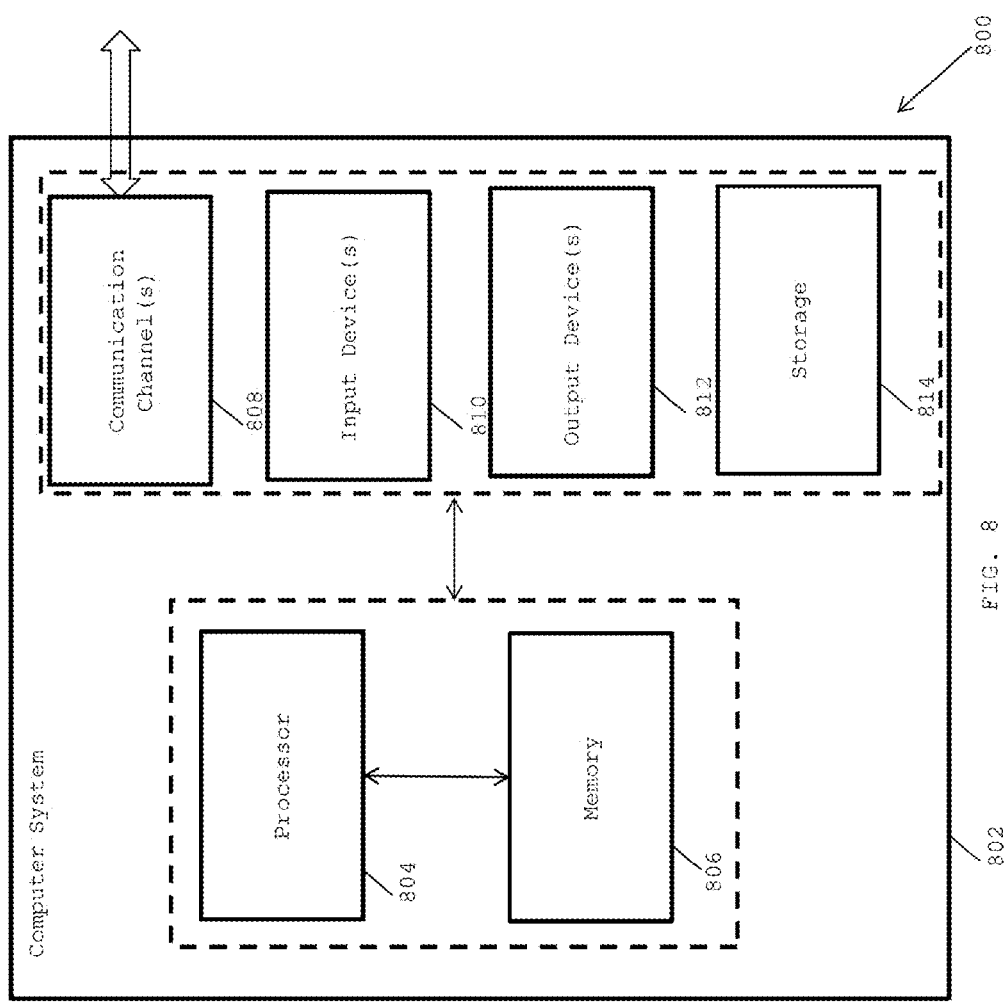

METHOD AND SYSTEM FOR OPTIMIZED MONITORING AND IDENTIFICATION OF ADVANCED METERING INFRASTRUCTURE DEVICE COMMUNICATION FAILURES

FIELD OF THE INVENTION

The present invention relates generally to the field of detecting communication failures in advanced metering infrastructure devices and more specifically to a method and system for optimized monitoring and identification of advanced metering infrastructure device communication failures.

BACKGROUND OF THE INVENTION

Nowadays, various electric utility companies are upgrading their electricity metering assets to Advanced Metering Infrastructure (AMI) network. An electric utility company is a power source that involves generation, transmission, and distribution of electricity for public consumption. AMI network is an architecture which comprises various non-Internet Protocol (non-IP) based devices and IP based devices and facilitates measuring and recording electricity usage data at predefined time intervals via various communication channels. The non-IP devices include advanced electricity metering devices (referred hereinafter as smart meters) which are electronic meters that record electricity consumption, load, billing and other metering data based on programmed logic. The smart meters are capable of transmitting the stored data to data-centers of electric utility company via the various communication channels upon request. The IP devices include network access points, relays etc. of the AMI network which facilitate two-way communication between the smart meters and the data-centers of electric utility companies via the various communication channels.

For optimal functioning of the smart meters, communication connectivity of all the AMI devices in the AMI network is a vital necessity. Communication failure of the smart meters or any other device in the AMI network disrupts the operation of the AMI network. Conventionally, in the event of a communication failure, faulty non-IP devices (i.e. smart meters) are detected by either identifying missing data or discovering Network Interface Card (NIC) communication failure event generated by the smart meters. However, this can be done only after network connectivity is restored, which may take any time ranging from a few minutes to a few days. This is so, as typically, the smart meters after experiencing a communication failure generate an event and store the event data, which can be collected and processed only after the network is restored.

Another conventional technique for detecting faulty IP devices and non-IP devices may include sequential mass pinging of the devices at regular intervals (for example using Internet Control Message protocol (ICMP) ping for AMI IP devices and data ping for AMI non-IP devices). Sequential mass pinging is a time-consuming process, and moreover, mass pinging of devices may also cause network packet bursts due to multiple packet flows and multiple packet arrival rates consuming the available limited bandwidth for AMI network and vast number of AMI devices. Accordingly, for IP and non-IP devices separate techniques exist for detecting communication failures. In addition, the above mentioned techniques entail cumbersome monitoring services and large communications overhead, even, in a small geographic area of the AMI devices. Further, in case of a large network, using abovementioned techniques to monitor and detect AMI device connectivity becomes infeasible.

In light of the abovementioned disadvantages, there is a need for a method and system for efficiently detecting communication failures of AMI devices with minimal communications overhead. Also, there is a need for a method and system for optimized monitoring and identification of AMI device communication failures. In addition, there is a need for a method and system for real time monitoring and detection of AMI device communication failures. Further, there is a need for a method and system that facilitates detecting all AMI IP and AMI non-IP device communication failures. Furthermore, there is a need for a method and system for identifying AMI devices experiencing communication failures in large network with minimum communication overhead.

SUMMARY OF THE INVENTION

A computer-implemented method for optimized monitoring and identification of Advanced Metering Infrastructure (AMI) device communication failures in an AMI network via a processor executing program instructions stored in a memory is provided. The computer-implemented method comprises generating, via the processor, a graphical representation of the AMI devices. The graphical representation comprises nodes corresponding to the AMI devices and links representing the connectivity between the AMI devices. The graphical representation is generated based on data associated with the AMI devices retrieved via the AMI network in real-time. Further, the method comprises computing, via the processor, one or more properties of the AMI devices using the graphical representation. The one or more properties are computed based on values associated with the nodes corresponding to the AMI devices in the graphical representation. Furthermore, the method comprises modifying, via the processor, the graphical representation based on the computed one or more properties and one or more predefined rules. The nodes corresponding to the AMI devices are updated based on the computed one or more properties and the one or more links are modified based on the one or more predefined rules. The method further comprises selecting, via the processor, one or more nodes in the modified graphical representation and processing the selected nodes in an order based on AMI device hierarchy, priority and criticality. Furthermore, the method comprises modifying, via the processor, the graphical representation based on the processing of the selected nodes and identifying AMI device with communication failures from at least one of the generated and modified graphical representation of the AMI devices.

A system for optimized monitoring and identification of Advanced Metering Infrastructure (AMI) device communication failures in an AMI network for detecting communication failures is provided. The system comprises an AMI graph generating unit in communication with a processor and configured to generate a graphical representation of the AMI devices. The graphical representation comprises nodes corresponding to the AMI devices and links representing the connectivity between the AMI devices. The graphical representation is generated based on data associated with the AMI devices retrieved via the AMI network in real-time. Further, the system comprises an AMI device monitoring unit in communication with the processor and configured to modify, via the AMI graph generating unit, the graphical representation based on computed one or more properties and one or more predefined rules associated with the nodes. Furthermore, the system comprises an AMI device communication failure identification unit in communication with the processor and configured to compute priority and criticality of the nodes using the modified graphical representation. The nodes are categorized and processed based on AMI device hierarchy priority and criticality for detecting AMI device communication failures.

A computer program product comprising a non-transitory computer-readable medium having computer-readable program code stored thereon is provided. The computer-readable program code having program instructions, when executed by a processor, cause the processor to: generate a graphical representation of the AMI devices. The graphical representation comprising nodes corresponding to the AMI devices and links representing the connectivity between the AMI devices. The graphical representation is generated based on data associated with the AMI devices retrieved via the AMI network in real-time. Further, the computer-readable program code having program instructions, when executed by the processor, cause the processor to compute one or more properties of the AMI devices using the graphical representation. The one or more properties are computed based on values associated with the nodes corresponding to the AMI devices in the graphical representation. Furthermore, the computer-readable program code having program instructions, when executed by the processor, cause the processor to modify the graphical representation based on the computed one or more properties and one or more predefined rules. The nodes corresponding to the AMI devices are updated based on the computed one or more properties and the one or more links are modified based on the one or more predefined rules. Further, the computer-readable program code having program instructions, when executed by the processor, cause the processor to select one or more nodes in the modified graphical representation and process the selected one or more nodes in an order based on AMI device hierarchy, priority and criticality. Furthermore, the computer-readable program code having program instructions, when executed by the processor, cause the processor to modify the graphical representation based on the processing of the selected nodes. Further, the computer-readable program code having program instructions, when executed by the processor, cause the processor to identify AMI devices with communication failures from at least one of the generated and modified graphical representation of the AMI devices.

BRIEF DESCRIPTION OF THE ACCOMPANYING DRAWINGS

The present invention is described by way of embodiments illustrated in the accompanying drawings wherein:

FIGS. 2A and 2B illustrate an exemplary graphical representation of the AMI devices, in accordance with an embodiment of the present invention;

Figure 6:
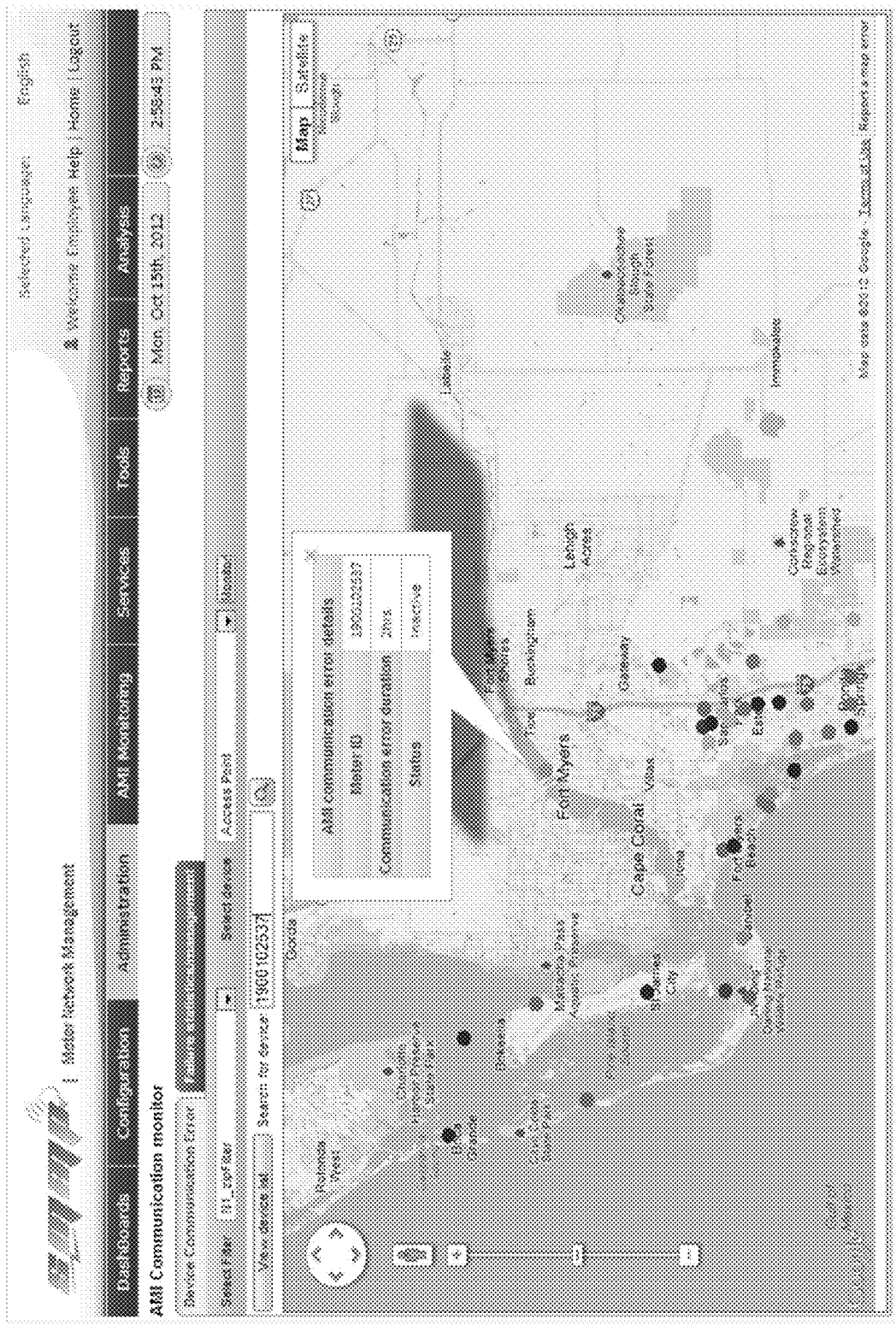
Figure 7:
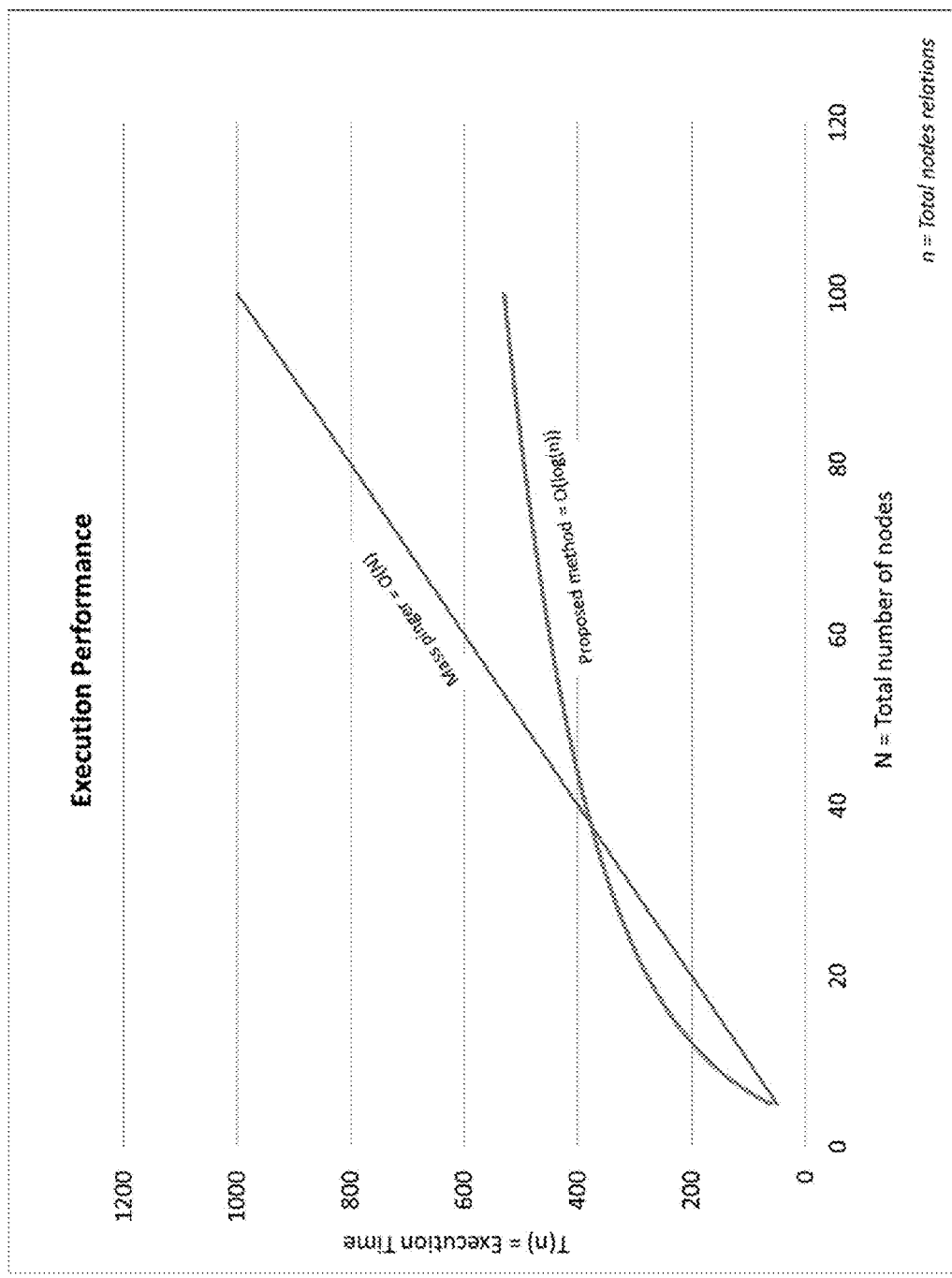

FIGS. 4A, 4B, 4C, and 4D illustrate a flowchart of a method for optimized monitoring and identification of communication device failures, in accordance with another embodiment of the present invention;

FIGS. 5A, 5B, 5C, 5D, 5E, 5F, 5G, 5H, and 5I illustrate an exemplary flowchart of a method for optimized monitoring and identification of communication device failures, in accordance with yet another embodiment of the present invention;

FIG. 6 is an exemplary screenshot of a geo-location view of failed AMI devices detected, in accordance with an embodiment of the present invention; and FIG. 7 is an exemplary graph representing comparison of execution time for detecting communication failures in AMI devices as described in accordance with various embodiments of the present invention vis-a-via conventional mass pinging method for detecting communication failures in AMI devices; and FIG. 8 illustrates an exemplary computer system in which various embodiments of the present invention may be implemented.

DETAILED DESCRIPTION OF THE INVENTION

A system, method and computer-program product is provided for monitoring and identifying communication failures in Advanced Metering Infrastructure (AMI) devices. The invention provides for a method and system to generate a graphical representation of the AMI devices and connectivity between the various AMI devices. Further, the invention provides a method and system for traversing the generated graphs for identifying AMI device communication failures, and updating the graph i.e. graph-node and links in the graph, based on latency of AMI devices, inter-relationships of those AMI devices, predefined rules and predefined and/or calculated properties/parameters. Furthermore, the invention provides for an iterative process to detect AMI device(s) communication failures in an optimized manner using the graphical representation of the AMI devices.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
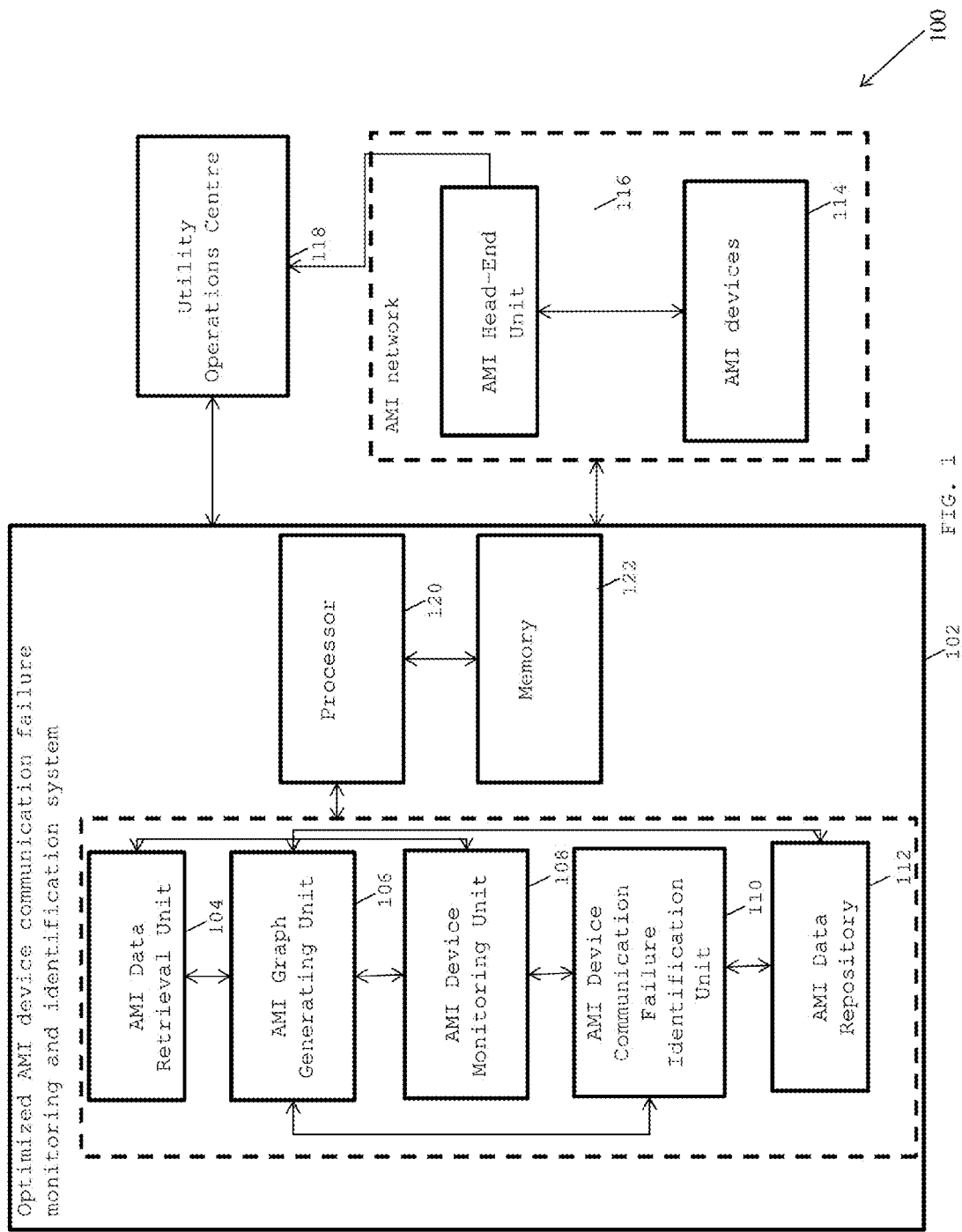
FIG. 1 is a block diagram of a system for monitoring and identifying communication failures in Advanced Metering Infrastructure (AMI) devices, in accordance with an embodiment of the present invention.

FIG. 1 is a block diagram of a system for monitoring and identifying communication failures in Advanced Metering Infrastructure (AMI) devices, in accordance with an embodiment of the present invention. The system is referred as optimized AMI device communication failure monitoring and identification system 102. In various embodiments of the present invention, the optimized AMI device communication failure monitoring and identification system 102 comprises an AMI data retrieval unit 104, an AMI graph generating unit 106, an AMI device monitoring unit 108, an AMI device communication failure detecting unit 110, and an AMI data repository 112. Further, the optimized AMI device communication failure monitoring and identification system 102 comprises a processor 120 and a memory 122. The AMI data retrieval unit 104, the AMI graph generating unit 106, the AMI device monitoring unit 108, the AMI device communication failure detecting unit 110, and the AMI data repository 112 executes various functionalities via the processor 120 using program instructions stored in the memory 122.

In various embodiments of the present invention, AMI network includes multiple devices (i.e. AMI devices 114) that are interconnected, and facilitate communication with an electric utility company for providing real time data on power consumption at customer sites. The customer sites may include residential site, commercial site and industrial site, which are served by respective substations. Substations are owned and operated by the electric utility company for supplying electricity for consumption. Further, energy usage monitoring data, billing data, and other metering data may also be retrieved by the electric utility company via the network of AMI devices 114. The AMI devices 114 include, but are not limited to, Internet Protocol (IP) based devices such as access points and relays and non-IP based devices i.e. the smart meters. As will be understood by a person of ordinary skill in the art, in some instances, smart meters may also be IP devices. The AMI network engages in back and forth communication with a utility operations centre 118 of the electric utility company via an AMI head-end unit 116. The AMI head-end unit 116 is a communication gateway between the AMI network, the utility operations centre 118 or any other external systems. The utility operations centre 118 retrieves various data i.e. power consumption data, energy usage monitoring data, billing data, and other metering data from the AMI network via the AMI head-end unit 116 either on a real time basis or at scheduled time intervals. In an embodiment of the present invention, the utility operations centre 118 is operated by human resources supported by various information technology systems. In another embodiment of the present invention, the utility operations centre 118 is operated by electronic systems. Wireless and/or wired communication channels facilitate back and forth communication between the AMI network and the utility operations centre 118 via the AMI head-end unit 116.

In an embodiment of the present invention, the optimized AMI device communication failure monitoring and identification system 102 communicates with the AMI devices 114 via the AMI head-end unit 116 to retrieve and process AMI data associated with the AMI devices 114. This will be explained in detail in later sections of the specification. Further, the optimized AMI device communication failure monitoring and identification system 102 updates the utility operations centre 118 with the processed data.

In an embodiment of the present invention, the AMI data retrieval unit 104 in the optimized AMI device communication failure monitoring and identification system 102 is configured to retrieve AMI data associated with the IP based AMI devices 114 and non-IP based AMI devices 114 in real-time or at scheduled time intervals via the AMI head-end unit 116. The AMI data includes AMI device data and AMI device network data. In an exemplary embodiment of the present invention, the AMI device data comprises asset data related to the IP and non-IP based AMI devices 114 i.e. access points, relays and smart meters. In yet another embodiment of the present invention, the AMI device data comprises data related to the type of smart meters i.e. smart meters deployed at a residential site, smart meters deployed at a commercial site, smart meters deployed at an industrial site, information about criticality of AMI devices 114 for ascertaining bellwether nodes, and other details describing location, region, or filter details etc. This will be explained in detail in later sections of the specification. In another exemplary embodiment of the present invention, the AMI device data comprises data related to inter-relationships across all the AMI devices 114 i.e. mapping data associated with access points, relays and smart meters, and network-hierarchy-details of access points, relays and smart meters associated with each other. In an embodiment of the present invention, the AMI data retrieval unit 104 retrieves the AMI device data by communicating with external AMI systems (i.e. meter data management systems or AMI data warehouse (not shown) which generally stores the AMI data in real time. In another exemplary embodiment of the present invention, the AMI device network data comprises response data for ping requests retrieved from each of the AMI devices. This will be explained in detailed in later sections of the specification. In another embodiment of the present invention, the AMI data retrieval unit 104 retrieves the AMI device network data via the AMI head-end unit 116. The AMI data retrieval unit 104 then sends the retrieved AMI data to the AMI graph generating unit 106 for generating a virtual representation of the AMI devices 114 and connectivity between the AMI devices 114.

In an embodiment of the present invention, the AMI graph generating unit 106 processes the data and uses the processed data to generate a graphical representation of the AMI devices 114. The graphical representation comprises various nodes representing the AMI devices 114 and various links representing the connectivity between the AMI devices 114. The access points are represented as nodes referred as Bottleneck-Network Element (BNE) node. One or more access points serve various devices such as smart meters and relays in the AMI network. In the graphical representation, the smart meters and relays are represented as nodes referred as Trailed Network Element (TNE) nodes. The TNE nodes are represented as being served by a single BNE or multiple BNEs. Further, nodes are created for multiple TNEs with root nodes representing relay and leaf nodes representing smart meters. These nodes are referred as Virtual-TNE nodes (V-TNE) nodes. As shown in FIG. 2A, after transformation of the nodes to V-TNE node, the V-TNE comprises: V1—New V-TNE Node, and set of V-Links i.e. {R1M1, R2M2, R3M3, R4M4}, where R represents relay and M represents smart meter. All the in-edges terminate at R1 and all smart meters point to V1. Further, all the out-edges originate from R1 and all smart meters start from V1. Referring back to FIG. 1, in an embodiment of the present invention, any BNE node or TNE node may be assigned as a Bellwether node by user of the optimized AMI device communication failure monitoring and identification system 102. The Bellwether nodes facilitate to presage future happenings. Any possible AMI device communication failure related alarming event can be determined by listening to the state or data of these Bellwether nodes before the mass and critical failure is detected. These nodes are the BNEs or TNEs acting as a gateway or as line-meters for critically served areas such as hospitals, air-ports, high-density residential zones or very high-power-consuming commercial and industrial areas etc. Further, the links between the various nodes are formed based on network communication of the corresponding AMI devices 114. The graph nodes are updated in real-time based on state of the AMI devices 114. These graph nodes and interconnections between the graph nodes are used for prioritizing the nodes (i.e. AMI devices 114) for communication failure detection and to identify critical nodes (i.e. AMI devices 114) for detecting communication failures. This will be explained in detail in later sections of the specification. In an exemplary embodiment of the present invention, programming languages such as C++, .Net may be used to create the graphical representation.

In an embodiment of the present invention, the generated nodes (i.e. BNE, TNE and V-TNE) are categorized into regions and sub-regions in the graphical representation. A region is representation of a geographical area comprising of a particular set of access points, smart meters and relays in the AMI network (i.e. AMI isomorph). The geographical area may be identified by distribution area, ZIP-code or predefined filters. In an exemplary embodiment of the present invention, the filters are special grouping of AMI devices 114 based on user defined criteria. The user defined criteria may include, but are not limited to, number of the AMI devices 114, and combination of set of AMI devices 114 with different states such as active or disconnected etc., type such as commercial or residential etc. and other details such as consumer details, zip code, service location etc. A sub-region is a representation of an individual area served by each BNE (i.e. access point in the AMI network). Each region includes one or more sub-regions.

Further, each node in the region is characterized by one or more parameters based on which nodes are prioritized for monitoring and identification of communication failures. In an embodiment of the present invention, the one or more parameters are predefined based on, but not limited to, location of the AMI devices 114, type of AMI devices 114, estimated time of device ping-operation of the AMI devices 114, inter-relationship between various AMI devices 114. In an exemplary embodiment of the present invention, the one or more parameters include a region-code which is assigned to each node in the graph. In one example, the region code may be of characters and may have the following format: [Region Category: Fixed length—1] [Region identifier: Fixed length—9 characters] [Region-Name: Fixed length—5 characters] [Node-Level: Fixed Length—4 characters]. The 'Region Category' may include Z category for regions formed with nodes belonging to ZIP code. The 'Region Category' may further include 'F' category for regions formed with nodes belonging to predefined filters. Further, the 'Region Category' may include 'S' category for regions formed with nodes belonging to a particular substation. The 'Region Identifier' may include a unique predefined 9-digit number assigned to each region. The 'Region-Name' includes a predefined name assigned to each region. The 'Node-Level' category defines position of a particular node in a particular region. For example, 'Node Level' value for a BNE representing access point may be root node 01 i.e. RN01, 'Node-Level' value for a TNE representing relay may be intermediate node 02 i.e. IN02, 'Node-level' value for a TNE representing smart meter may include leaf node 01 i.e. LN01. Example of a region code assigned to a TNE representing smart meter in a particular region may include Z000001979_SW14LN01, F000001166FILTRRN01.

In another exemplary embodiment of the present invention, the one or more parameters include R-factor which is a predefined constant value that represents the inter-relationship between various regions. In an example, R-factor for intra-regional relationship is 0.01, R-factor for regional relationship is 1.28 and R-factor for inter-regional relationship is 163.84. Therefore, R-factor representing relationships between various regions follow the order (intra-regional)<R-factor (regional)<R-factor (inter-regional).

In yet another exemplary embodiment of the present invention, the one or more parameters include Type-factor (T-factor) for smart meters, access points and relays. The T-factor based on the smart meter type (i.e. residential smart meters, commercial smart meters, and industrial smart meters) follow the ranking order T-factor (industrial smart meter)>T-factor (commercial smart meter)>T-factor residential smart-meter). Further, the T-factor associated with access point and relays are of a higher order than the T-factor for smart meters i.e. T-factor (access point)>T-factor (relay)>T-factor (smart meter). In an exemplary embodiment of the present invention, the user configures T-factor values as per abovementioned conditions. In another exemplary embodiment of the present invention, predefined sequential values are assigned and considered as per abovementioned conditions.

In another exemplary embodiment of the present invention, the one or more parameters include Time Of Day-weight (TOD-Weight). TOD-weight is a weight assigned to certain selected time-zones. For example, weight assigned to time zone 'morning: 5 AM to 12 PM' is '1/4'. Weight assigned to time zone 'afternoon: 12 PM to 6 PM' is '1/3'. Weight assigned to time zone 'evening: 6 PM to 10 PM' is '1/2'. Further, weight assigned to time zone 'night: 10 PM to 5 AM is '1/1', where weight '1/1' is the heaviest weight. The night time zone is assigned the heaviest weight as meter communications is typically higher at this time zone due to metering operations such as reporting of metering data to the electric utility, peak hour monitoring, routine meter readings etc. In an exemplary embodiment of the present invention, the TOD-weight can be configured by the user of the optimized AMI device communication failure monitoring and identification system 102. In another exemplary embodiment of the present invention, the TOD-weight may be predefined.

In an embodiment of the present invention, the AMI device monitoring unit 108 uses an iterative methodology to monitor and detect communication failures in the AMI devices 114 via the AMI graph generating unit 106 and the AMI data retrieval unit 104. In particular, in an embodiment of the present invention, initially, the AMI graph generating unit 106 creates a directed graph of the nodes, for example, G={BNE1, BNE2 . . . BNEn} and the nodes are categorized into regions and sub-regions (as discussed previously). The AMI device monitoring unit 108 initiates the monitoring process by selecting a region. In an exemplary embodiment of the present invention, the AMI device monitoring unit 108 identifies the regions based on region code and selects the regions in a sequential manner. In another exemplary embodiment of the present invention, the regions are selected based on priority assigned to each region by the user as per the electric utility preference. During the monitoring phase, the graph nodes and the graph edges are updated with values corresponding to actual data related to state of the AMI devices 114 obtained by the AMI data retrieval unit 104. The AMI data retrieval unit 104 retrieves these values via the AMI Head-end unit 116, the AMI device monitoring unit 108 processes the retrieved values and sends the results to the AMI graph generating unit 106. Based on the monitoring results, the AMI graph generating unit 106 updates the generated graph.

Figure 5A:
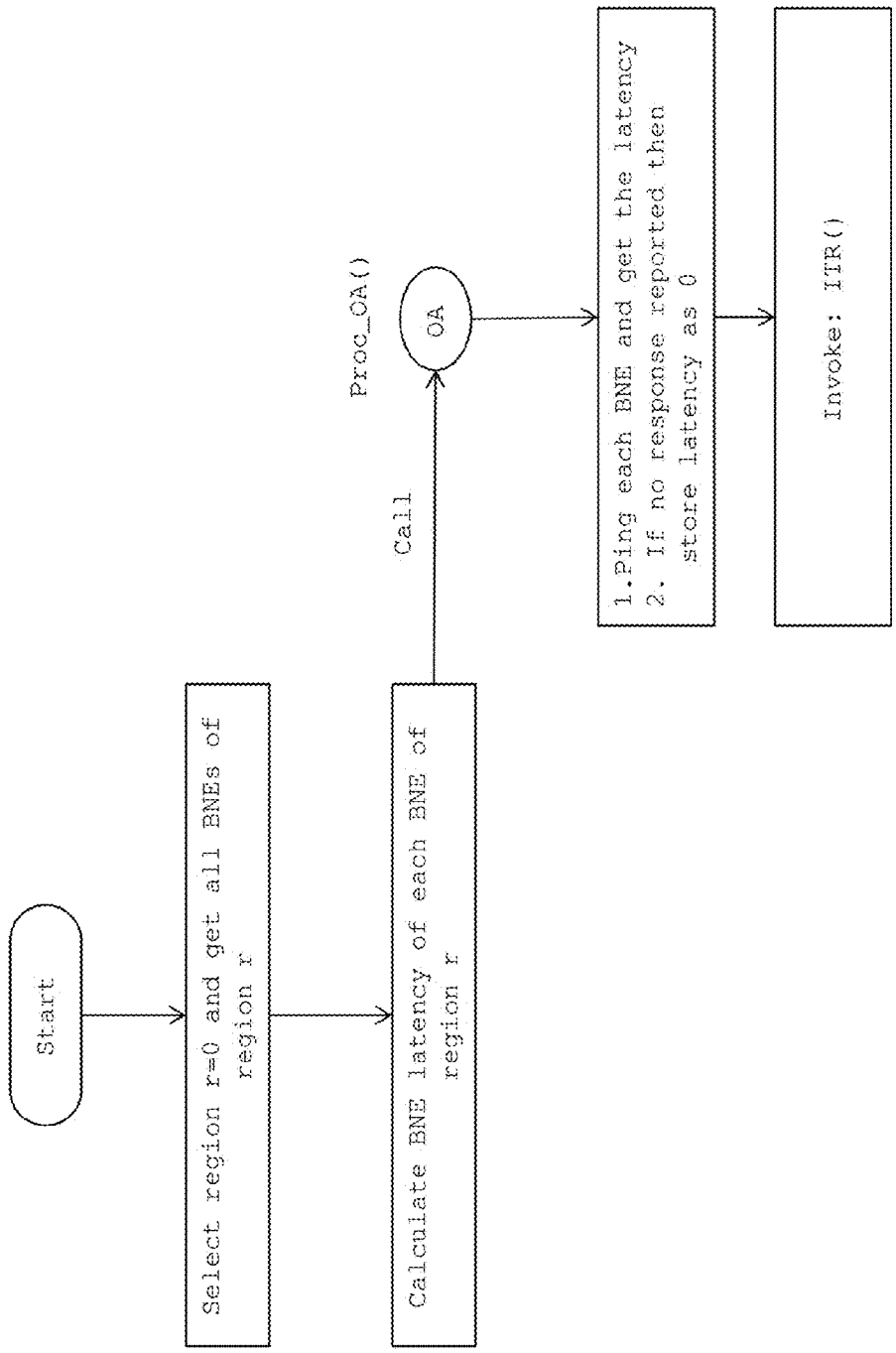

Hierarchical Device (i.e. Access Point or BNE) Communication Failure Identification for Selected Region In an embodiment of the present invention, the AMI device monitoring unit 108 creates network communication history of each BNE in the selected region of the directed graph. The AMI device monitoring unit 108 creates the network communication history by obtaining latency values of each BNE in the selected region. BNE latency is defined as the time taken to obtain response from each BNE. As discussed previously, the BNE nodes in the selected region represent the trend or state of access points in a particular geographical area. The BNE latency is obtained by pinging each access point (corresponding to the BNE nodes) in the selected region. The AMI device monitoring unit 108 invokes the AMI data retrieval unit 104 to send pinging request to the access points via respective access point pinging interfaces (available in the AMI Head-end unit 116) in a geographical area corresponding to the selected region in the graphical representation. The AMI data retrieval unit 104 retrieves the pinging response from the access points and stores the pinging response with the AMI data repository 112. The pinging response represents the latency value for each of the access points. These values are processed by the AMI device monitoring unit 108, and used by the AMI graph generating unit 106 for updating the corresponding BNEs in the directed graph with respective latency values. In case of no response, the BNE latency value is represented as '0' (as shown in FIG. 5A).

Further, the AMI graph generating unit 106 creates the directed graph using set of all BNEs in a selected region and by obtaining the required data from the AMI data retrieval unit 104 related to the number of relays and smart meters attached to each access point in the geographical area corresponding to the selected region in the graphical representation. The AMI graph generating unit 106 updates the directed graph edges based on the number of TNEs (corresponding to the relays and smart meters) attached to each BNE (corresponding to the access points) in the selected region. The AMI device monitoring unit 108 retrieves data related to the number of TNEs attached to each BNE in the selected region from the AMI graph generating unit 106 and computes the total number of TNEs. The total number of TNEs is referred as node-count for each BNE.

The AMI device monitoring unit 108 retrieves the latency values from the AMI graph generating unit 106 to compute latency data, and sends the computed latency data and the computed node-count data to the AMI graph generating unit 106 in order to create and update the network history of each BNE. In particular, based on these two properties, the AMI graph generating unit 106 defines the relationship between each node of the directed graph 'G' to generate links between each node. In an exemplary embodiment of the present invention, the direction of the graph edge is modified from node with lower latency and least node count to node with higher latency and higher node-count. For example, if BNE latencies (BL, in seconds) for each BNE i.e. B1, B2, B3, B4 and B5 (BNE and TNE attached to BNE is represented as B) of the selected region is of the order BL={9, 14, 11, 15, 10} and node count (BC) for each BNE is BC={2, 4, 2, 5, 3}, the modified direction of the graph edges for these nodes i.e. for B1, B2, B3, B4 and B5 is as follows: B1→{B2, B4, B5}; B2→{B4}; B3→{B2, B4}; B4→{Null}; B5→{B2, B4}. An exemplary representation of the modified directed graph illustrating the above is shown in FIG. 2.

The AMI device communication failure identification unit 110 communicates with the AMI device monitoring unit 108 to retrieve the computed latency data and node-count data for each BNE, and estimate another node property i.e. priority value for each BNE. In an exemplary embodiment of the present invention, the priority value may be calculated using the following formula for the selected region:

$$P(n)=((A-L/A)+((T*pCnt)+(pCnt*hconstant))+(T*ICnt)+(B/W)$$

where, A is average latency of all the nodes, L is previous latency, T is T-factor of the BNEs, W is total number of Bellwether nodes, B is Bellwether flag, pCnt is total number of BNEs attached in B, and ICnt is total number of TNEs attached in B. If BNE is attached to another BNE a predetermined hconstant=0.11061979 is added, i.e. if BNE is attached to another BNE the priority value is higher as compared to TNE attached to BNE. Using the above formula it is found that nodes with response time '0' sec have the highest priority.

Figure 5B:
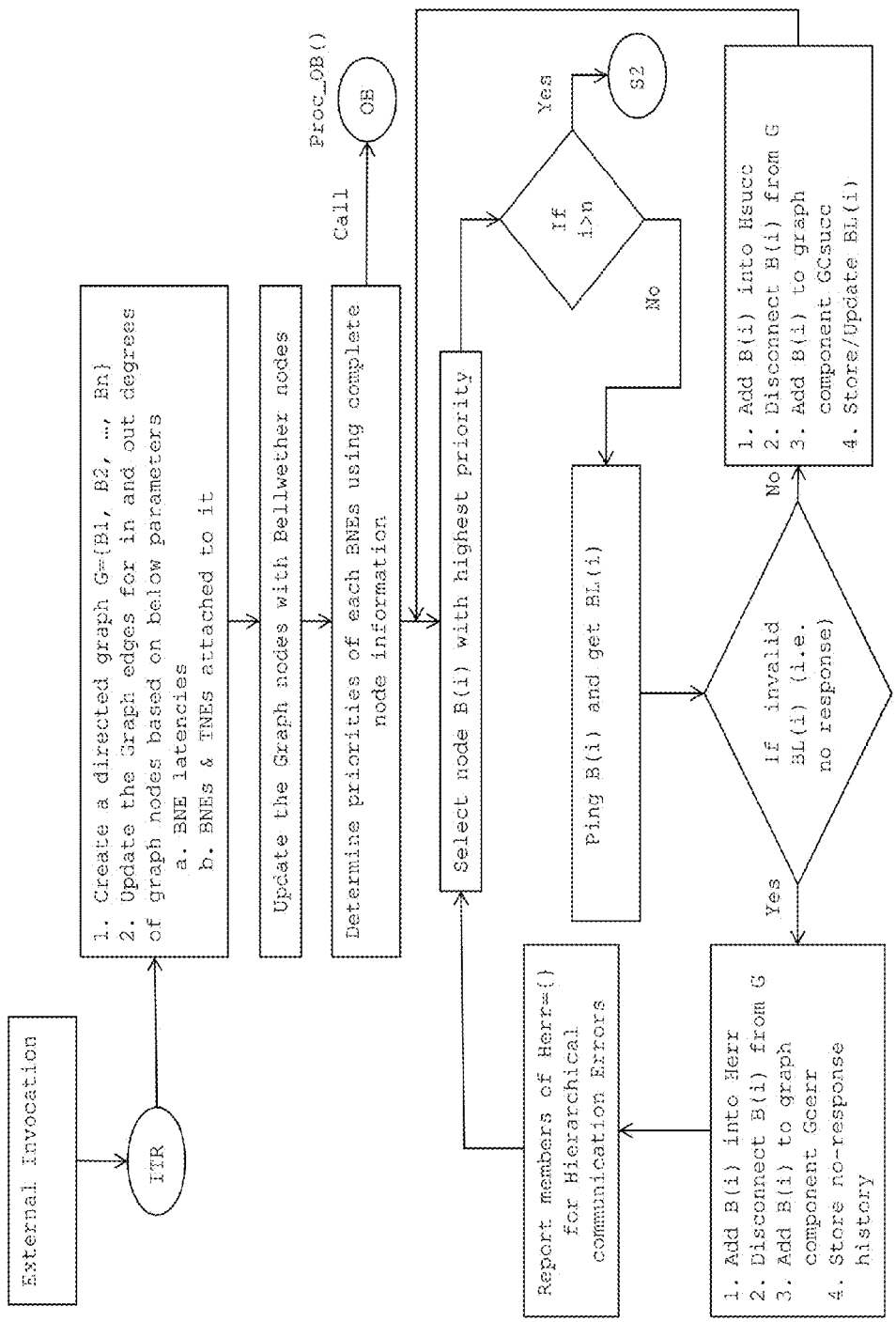

The AMI device monitoring unit 108 selects the BNE nodes in order of their priority value from highest to lowest. The AMI device monitoring unit 108 communicates with the AMI data retrieval unit 104 AMI head-end unit 116 to ping the selected BNE nodes (i.e. access points) via the AMI head-end unit 116, obtains the BNE latency values and updates the BNE latency in the graphical representation via the AMI graph generating unit 106 (as discussed previously). In an embodiment of the present invention, if the calculated latency is 0 sec i.e. no valid response from the access point, the BNE node is identified as the AMI device with communication failure and is referred as 'hierarchical device communication failure'. The identified BNE nodes are added to a list of 'hierarchical communication errors' (i.e. 'HCerr') stored in the AMI data repository 112. The AMI graph generating unit 106 retrieves the list of 'hierarchical communication errors' from the AMI data repository 112 and disconnects the BNE nodes from the modified directed graph. Further, the AMI graph generating unit 106 adds the BNE nodes to a graph component referred as 'Gcerr' (Graph component with error-nodes). In another embodiment of the present invention, if the calculated latency is not '0' sec, the selected BNE nodes are added to a list of 'hierarchical successful nodes' (i.e. 'Hsucc') stored in the AMI data repository 112 and the AMI graph generating unit 106 disconnects such BNE nodes from the modified directed graph. Further, the AMI graph generating unit 106 adds the BNE nodes to another graph component 'GCsucc' (i.e. Graph component with successful-nodes) and updates the latency value for the BNE nodes. This process is repeated for all BNE nodes (n) of a given directed graph which are selected in order of their priority from highest to lowest (as shown in FIG. 5B).

Device Communication Failure (i.e. Smart Meter and Relay Communication Failure) Detection for the Selected Region In an embodiment of the present invention, after repeating the above process for all BNE nodes in a specified sequence based on its priority, the AMI device monitoring unit 108 retrieves the 'Hsucc' list from the AMI data repository 112. The AMI device monitoring unit 108 identifies De-Bouncing nodes (DBN) from the nodes of the 'HSucc' list which have responded to ping request and ascertains the debouncing delays (Ddbn) of the debouncing nodes. Debouncing nodes are the BNE nodes and TNE nodes (i.e. corresponding access points, smart meters or relays) which has the property of least probability of communication failures after being pinged multiple times based on, for example, network ping history of all the BNE nodes.

In an exemplary embodiment of the present invention, the debouncing nodes are identified from the nodes in the list 'Hsucc' by, firstly, obtaining ping history of each of the nodes for 'h' hours, where 'h' is configurable. Secondly, a previous set of de-bouncing nodes are obtained and combined with the nodes of the 'Hsucc' list to form a new list 'H'succ' and the bellwether nodes (i.e. BNE and TNE) are selected from the list. Further, probability of pinging each node multiple times (Pm) is calculated. If a particular node fails 'n' times out of 'N' pings for all iterations of last 'h' hours, then the probability of failure is calculated as Pf=(n/N). If Pf value is 1 or near to 1, then this node has less chance of becoming a debouncing node. Further, if the particular node is pinged 'N' times in last 'h' hours using 'i' iterations, the ping rate per hour is Pr=(N/h). Chances for this node to be a debouncing node are high if the ping rate value is high. Furthermore, if a particular node is pinged 'N' times in last 'h' hours using 'i' iterations out of total 'T' pings for all the nodes of 'H'succ' list, the probability of pinging each node is Pm=(N/T). The chances of being debouncing nodes are high if the Pm value is high. In addition, the AMI device monitoring unit 108 may identify the debouncing nodes based on, R-factor of the selected region defining its node-relationship weight, T-factor of the nodes and priorities (Pdbn) associated with the nodes where chances of nodes with lesser priority are more for becoming debouncing nodes. Exemplary algorithm for identifying debouncing nodes can be implemented using the following pseudo code.

```
Step 1 : Bubble sort based on Pdbn
For ( i=0 ; i< H`succ.count ; i++)
{
        for ( j = 0; j < H`succ.count; j++)
        {
                if ( H`succ [i].Pdbn < H`succ[j].Pdbn)
                {
                        Temp = H`succ[i];
                        H`succ[i] = H`succ[j];
                        H`succ[i] = Temp ;
                }
        }
}
Step 2: Check for Pavg and calculate DBN-Delay for each node
For ( i=0 ; i< H`succ.count ; i++)
{
        // search all elements having Pf = 0
                if ( H`succ[i].Pf == 0)
                {
                Goto Step-2 mentioned on slide 15;
                Get DBN delays for each node.
                }
}
Step 3: Check for Pf
For ( i=0 ; i< H`succ.count ; i++)
{
                // mark all elements having Pf > 0.5
                if ( H`succ[i].Pf > 0.5)
                {
    H`succ[i].markFailure = True ;
                }
}
//remove all markFailure elements
While (H`succ[i])
{
    if ( H`succ[i].markFailure )
                H`succ[i].remove( );
        else
                        i++;
}
Step 4: Check for Pm
For ( i=0 ; i< H`succ.count ; i++)
{
                // check Pm for higher value
                if ( H`succ[i].Pm > 0.5)
                {
                        H`succ[i].markHighPingRate = True ;
                        // Check for element having ping rate more
                        // then 4 per hours (or preconfigured value)
                        // maxPingsPerHours = 4
                        if   ( H`succp[i].Pr >= maxPingsPerHours )
                        {
                        H`succ[i].markHighPerHourRate = True ;
                        }
                }
}
While ( H`succ[i] )
{
        if ( H`succ[i]. markHighPerHourRate )
                        H`succ.remove( );
        else
                        i++ ;
}
```

After the debouncing nodes are identified, the AMI device monitoring unit 108 calculates the debouncing delays for these nodes. The debouncing delay is the property of debouncing nodes which ascertain the time-duration for which these nodes are not pinged. In an exemplary embodiment of the present invention, the debouncing delay is calculated by the AMI device monitoring unit 108. In another exemplary embodiment of the present invention, the debouncing delay is predefined by the user. If the calculated debouncing delay is found to be less than the predefined delay then the predefined delay is considered as the debouncing delay and vice versa.

In an exemplary embodiment of the present invention, the debouncing delay for a particular debouncing node may be calculated using the following formula: Ddbn=[Thr(ToD(hcur))*60*60]/n(req). The formula may be derived in the following manner:

A set of hour-values i.e. {h1, h2, h3, h4, ..., ht} is assumed, where '{h}' represents the previous hours for which pinging history is available or configured.

T is the predefined time interval between two subsequent iterations (in seconds).

Twt is the TOD-Weight for current time/hour.

For hour h1, the following are calculated:

Total actual successful pings during h1=n(h1)

Set of latencies for each ping R(h1)={p1, p2, ..., pn}

Average time to ping during h1=Pavg(h1)

Total actual ping-time in seconds P(h1)=p1+p2+ ... +pn

Total idle up-time for node in h1 in seconds as Uidle(h1)= [(60*60)−P(h1)]

Set of average ping time for each h hours={Pavg(h1), Pavg (h2), ..., Pavg(ht)} is calculated.

Using 'Method of Common Differences', difference between above members is calculated i.e. D[Pavg(h2)−Pavg(h1)], D[Pavg(h3)−Pavg(h1)], D[Pavg(h4)−Pavg (h3)], D[Pavg(ht)−Pavg(ht−1)]. The difference obtained is averaged and represented as Davg.

Similarly, set of idle up-time for h hours is calculated i.e Uidle={Uidle (h1), Uidle(h2), ..., Uidle(ht)}

Average of Uidle as Uavg is calculated.

Total hours of current time i.e. ToD (hour) is Thr(ToD (hcur)) and Twt (hcur)

Predicted idle up-time in seconds for this ToD is, Puidle= [Uidle*Thr(ToD(hcur))*60*60].

Predicted total-ping time for current ToD is calculated as Ppre=(Thr(ToD(hcur))*60*60)−Puidle Predicted total number of pings is calculated as, n(pred)= Ppre/Davg Hence based on Twt, Required pings for given ToD is a positive integer number: n(req)=round[(n(pred)*Twt)+ Twt]

The DBN-delay for this node in seconds is calculated using Ddbn=[Thr(ToD(hcur))*60*60]/n(req)

For the respective debouncing delay duration (i.e. Ddbn), the identified debouncing node is not pinged. After Ddbn, the nodes can be pinged. This 'wait-and-ping operation' sequence is repeated for n(req) times for a given debouncing node and this process is repeated for each of the debouncing nodes for their respective debouncing delay and 'n(req)'. As such, communication overhead and uncontrolled ping request burst for the corresponding AMI devices 114 are minimized.

The AMI device monitoring unit 108 sends data related to the identified debouncing nodes (DBN) to the AMI graph generating unit 106. The AMI graph generating unit 106 updates the graph component 'GCsucc' with the non-DBN nodes. Based on the BNE latencies (as discussed in conjunction with the 'hierarchical device communication failure identification for selected region'), the graph edges of 'GCsucc' are modified. Further, as discussed in conjunction with the 'hierarchical device communication failure identification for selected region', the AMI device communication failure identification unit 110 estimates the priorities of each of the BNE nodes and TNE nodes in 'GCSucc'. In an exemplary embodiment of the present invention, the priority of each BNE nodes and TNE nodes is calculated using the formula: P=L/A+((T*pCnt)+(pCnt*hConstant))+(T*lCnt)+

Figure 5C:
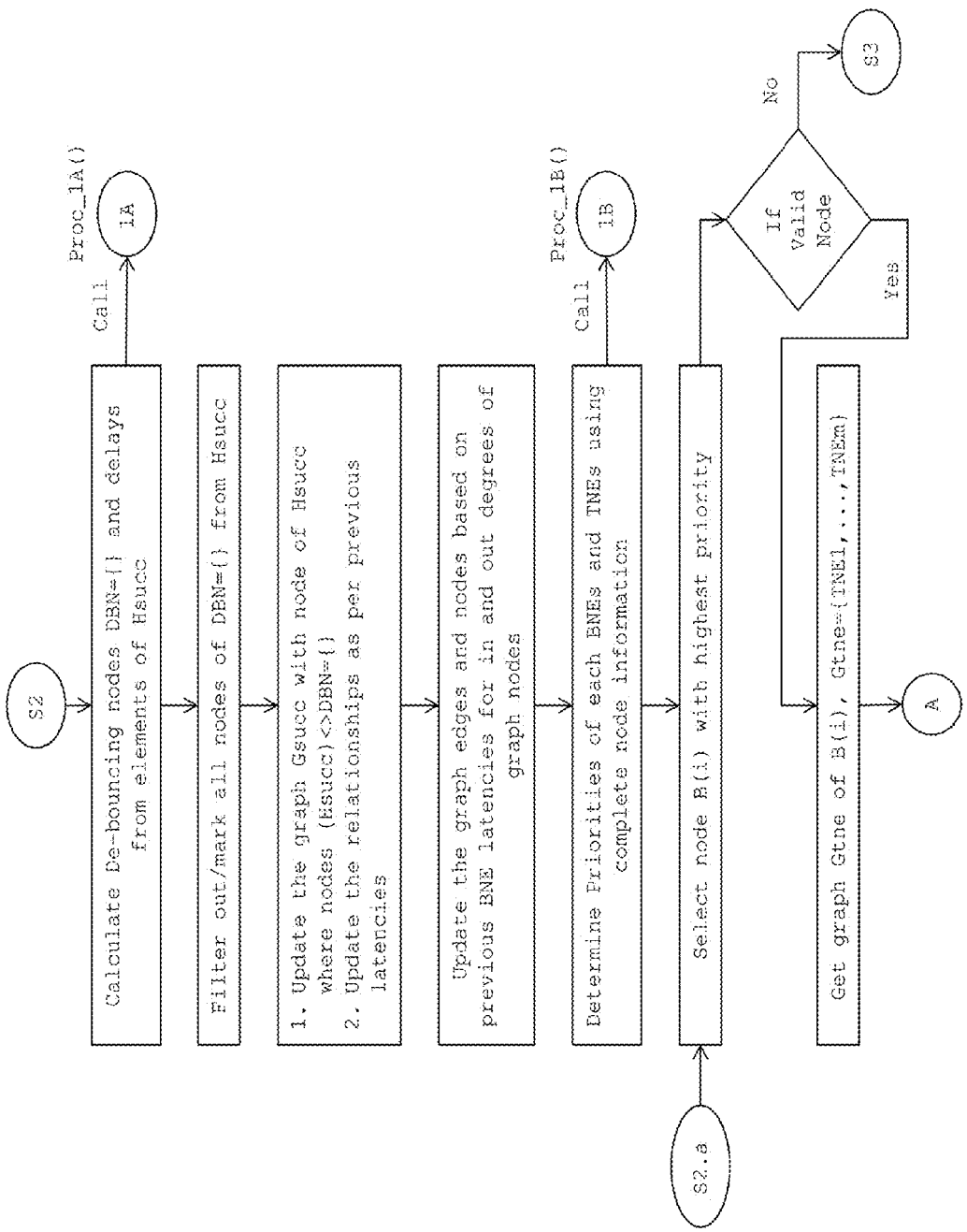

B/W where, A is average latency of all responding nodes, L is Previous latency, T is T-Factor of the BNE, B is Bellwether flag, Total number of Bellwether nodes in given region (W) and Total number BNEs (pCnt) and TNEs (lCnt). The AMI device monitoring unit 108 selects the BNE nodes in order of their priorities from highest to lowest and communicates the same to the AMI graph generating unit 106. The AMI graph generating unit 106 processes each of the TNE nodes attached to selected BNE node by obtaining the graphical representation 'Gtne'=[TNE1, ... TNEm] and by updating this graphical representation 'Gtne' for Bellwether TNE nodes and TNE priorities (as shown in FIG. 5C).

Figure 5D:
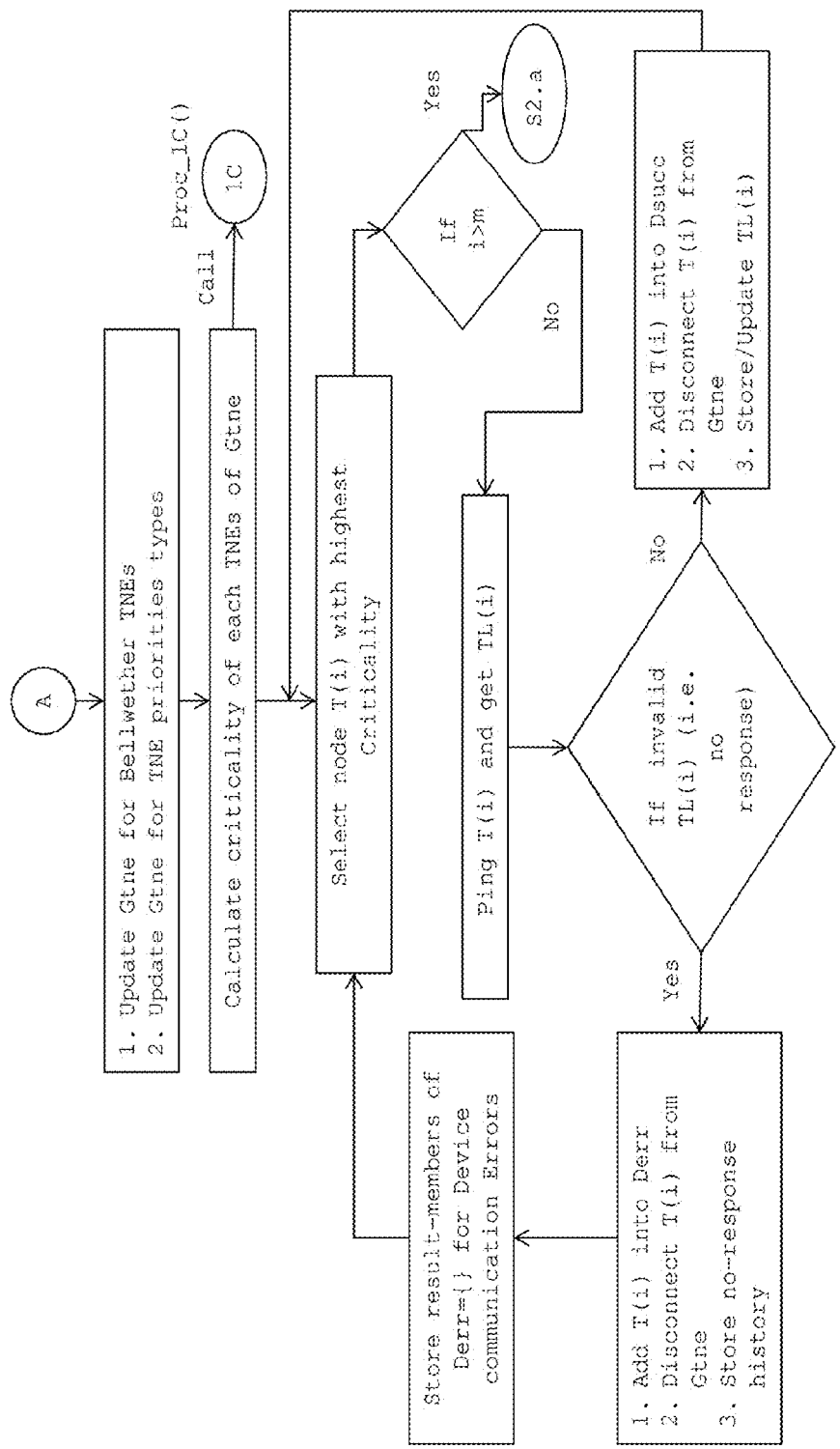

Further, the AMI device communication failure identification unit 110 communicates with the AMI device monitoring unit 108 to calculate the criticality of each of the TNEs of each of the BNEs nodes of 'GCsucc'. The TNE nodes are selected for further processing in order of their criticality starting from the highest to the lowest. In an exemplary embodiment of the present invention, criticalities of each of the TNEs are calculated by obtaining history of nodes for last 'n' hours. Further, TNE latency is obtained for each successful ping. Using known bubble-sort algorithm, the TNE nodes are sorted in an increasing order of node latency. The TNE node with maximum average latency is identified as the node with highest criticality (as shown in FIG. 5D). In an exemplary embodiment of the present invention, critical factor (cf) of each node is calculated using priority and average latency of each node for past known hours, using the formula cf=(priority*average node latency).

The AMI device monitoring unit 108 selects the TNE nodes in order of criticality starting from highest criticality to lowest criticality. The AMI device monitoring unit 108 communicates with the AMI data retrieval unit 104 to ping the smart meters and/or the relays associated with the selected TNE nodes, obtains the TNE latency values and updates the TNE latency in the graphical representation via the AMI grapg generating unit 106 (as discussed previously in conjunction with hierarchical device communication failure). In an embodiment of the present invention, if the calculated latency is '0' sec i.e. no valid response from the device, the TNE node is identified as the AMI device with communication failure and is referred as 'device communication failure'. The identified TNE nodes are added to a list of 'device communication errors' (i.e. 'DCerr') which is stored in the AMI data repository 112. The AMI graph generating unit 106 retrieves the list of 'device communication errors' (i.e. 'DCerr') from the AMI data repository 112 and disconnects the TNE nodes in the graph 'Gtne'. Further, the AMI graph generating unit 106 adds the TNE nodes to a graph component 'Derr' (i.e. Device error). In another embodiment of the present invention, if the calculated latency is not '0' sec, the selected TNE nodes are added to a list named as 'Device successful' (i.e. 'Dsucc') stored in the AMI data repository 112 and disconnects the TNE nodes from the graph component 'Gtne'. Further, the AMI graph generating unit 106 adds the BNE nodes to another graph component 'Dsucc' and updates the latency value for the TNE nodes. As discussed previously, this process is repeated for all TNE nodes (m) (as shown in FIG. 5D).

Figure 5E:
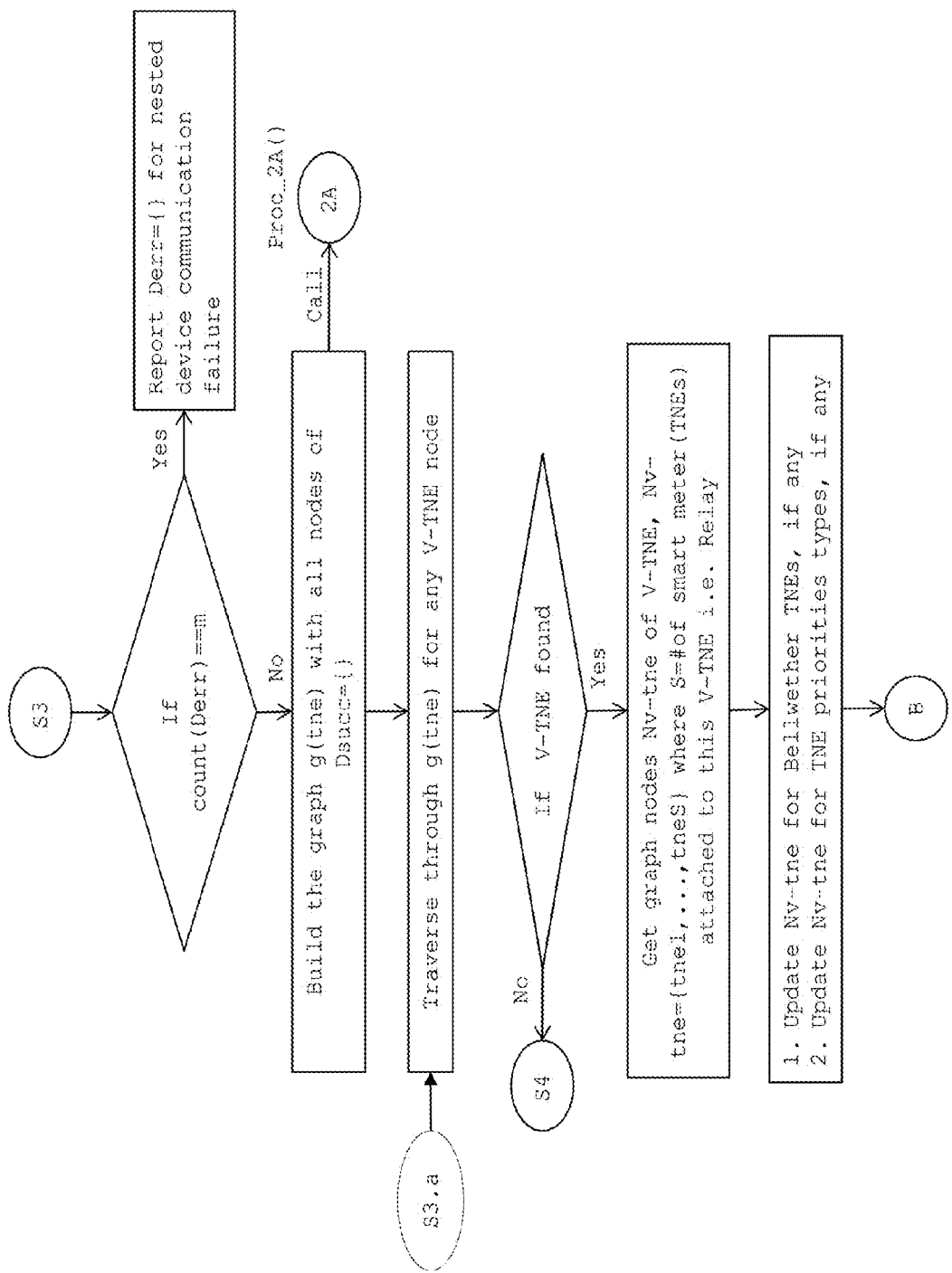

Nested Device Communication Failure (i.e. All Smart Meters and Relays Communication Failure) Detection for a Selected Sub-Region of the Selected Region In an embodiment of the present invention, after traversing through all the TNE nodes (m), the AMI device monitoring unit 108 retrieves the 'DCerr' list from the AMI data repository 112. The AMI device monitoring unit 108 checks if all the TNE nodes from the 'Derr' are facing communication failures using a simple check i.e. [count (Derr)==m]. In case all the TNE nodes are facing communication failure it is identified as a Nested device communication failure. In case all the TNE nodes are not facing communication errors, the AMI device monitoring unit 108 sends the data related to the identified TNE nodes to the AMI graph generating unit 106. The AMI graph generating unit 106 generates the directed graph with all nodes of 'Dsucc'. Further, the AMI graph generating unit 106 traverses this graph to find any VTNE nodes present in the graph. As discussed previously, Virtual-TNE (VTNE) nodes were generated by the AMI graph generating unit 106 based on an analysis of the relationship between TNE nodes attached to TNE nodes (i.e. relay to smart meter relations. Further, the AMI graph generating unit 106 assigns a weight to each VTNE node as total number of nodes present in respective VINE. Furthermore, as discussed in conjunction with the device communication failure section, latencies and priorities of each of the nodes of each VINE nodes are obtained. Based on the obtained latencies and priorities, the links between the VINE nodes are generated. For example, a link (i.e. directed edge) is generated from VTNE1 to VTNE2 if priority of VTNE1 is less than VTNE2. In the event, the priorities are same for VNE1 and VNE2, the link is generated between VTNE1 and VTNE2 based on the assigned weight. In the event, the assigned weights of the nodes are same, the link is generated between VTNE1 and VTNE2 based on the average latency of each of the nodes-latency of VINE node i.e. the link will be generated from VTNE1 to VTNE2 if average latency of VTNE1 is higher than the average latency of VTNE2. Abovementioned generated graph is updated for Bellwether nodes, if any and TNE priorities, accordingly altering the graph edges as applicable (as shown in FIG. 5E).

Figure 5F:
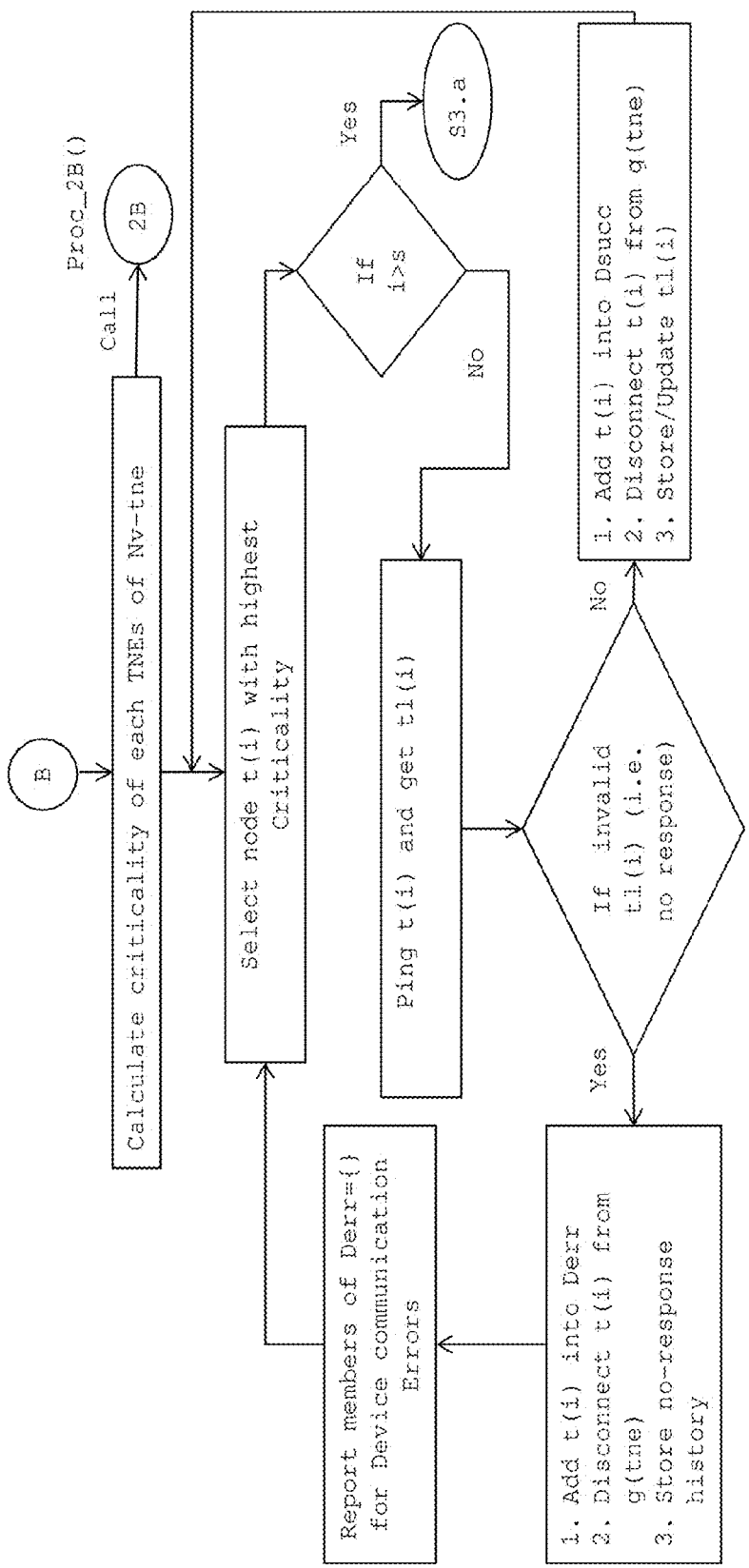

Furthermore, the AMI device communication failure identification unit 110 calculates criticality of the TNE nodes, as discussed in conjunction with the 'device communication failure section'. The AMI device monitoring unit 108 selects the TNE node with the highest criticality and identifies the TNE nodes with latency of '0' sec i.e. nodes with no valid response to pinging requests. The AMI device monitoring unit 108 then adds these nodes to the list of 'device communication errors' i.e. 'DCerr' in the AMI data repository 112. Further, the AMI device monitoring unit 108 identifies the TNE nodes which respond to the pinging request and adds these nodes to the list 'device successful' i.e. 'DSucc' in the AMI data repository 112. This process continues for all TNE nodes (s) present in selected VINE node (as shown in FIG. 5F).

In an embodiment of the present invention, after repeating the above process for all TNE nodes (s) in a specified sequence based on priority, the AMI device monitoring unit 108 may detect the identified debouncing nodes (DBN) in the selected region. In another embodiment of the present invention, three types of relationships are possible i.e. regional-relationship, inter-regional relationship, and intra-regional relationship. Regional-relationship is referred when two or more than two nodes of current DBN i.e. two or more BNEs of current DBN are in same region. Inter-regional relationship is referred when two or more than two nodes of current DBN i.e. two or more BNEs of current DBN are in different region. Intra-regional relationship is referred when two or more than two nodes of current DBN i.e. two or more BNEs and/or TNEs of current DBN are in same sub-region.

In an exemplary embodiment of the present invention, weight of each relationship (referred hereinafter as Rwt) can be calculated as an integrated weight of individual relationship weight using the formula Wr=(Pdbn of each node)*(R-

Figure 5G:
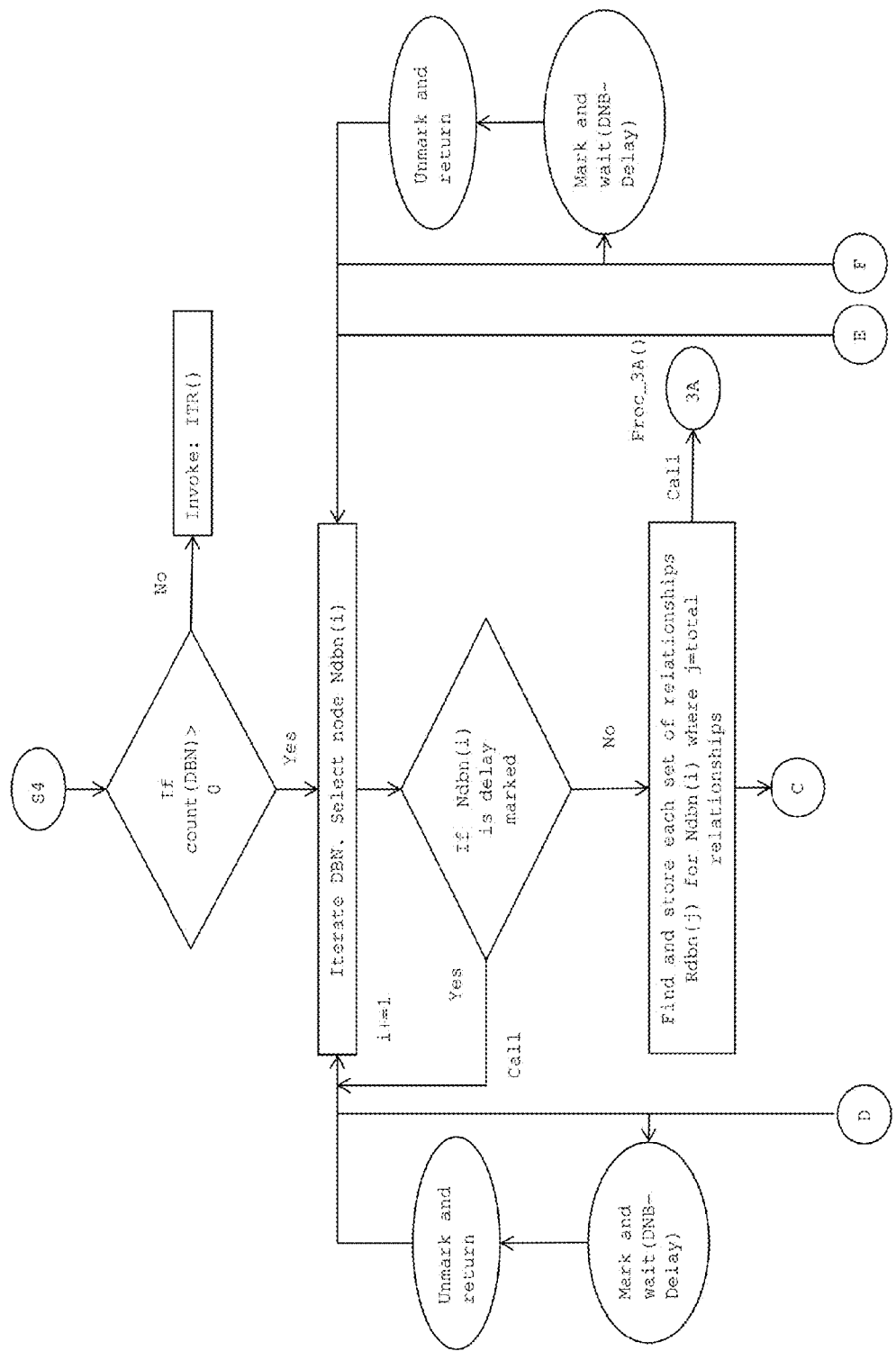
Figure 5H:
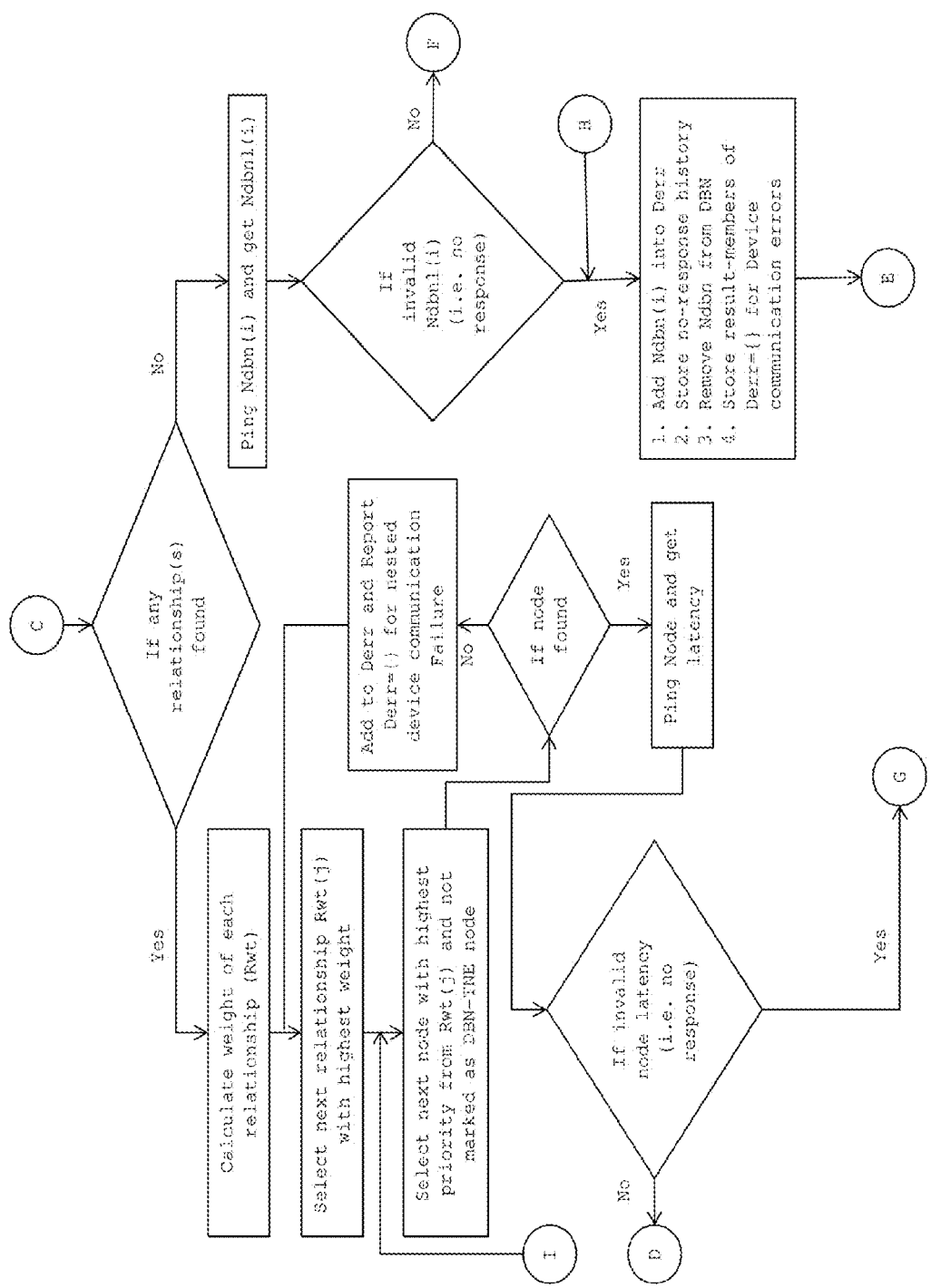

Factor of relationship), where Pdbn is priority of each node. Rwt is used to define the order of selection for relationships. Relationship with highest Rwt is selected first and vice versa (as shown in FIG. 5H).

Further, in case all the three types of relationships i.e. regional-relationship, inter-regional relationship, intra-regional relationship are present, Rwt for each relationship is calculated using the following formula:

$$\sum_{r=1}^{R} Rwt \text{ (intra)}[r] = \sum_{i=1}^{[Rintra(r)](n)} [Pdbn \ (i) * Rf \ \text{(intra)}]$$

$$Rwt \text{ (inter)} = \sum_{i=1}^{Rinter(n)} [Pdbn \ (i) * Rf \ \text{(inter)}]$$

$$Rwt \text{ (region)} = \sum_{i=1}^{Rregion(n)} [Pdbn \ (i) * Rf \ \text{(region)}]$$

Where,
n is the total number of DBNs in given set i.e.
Rinter/Rintra/Rregion
R is the set of nodes which belongs to same region
Rregion, Rinter and Rintra are the sets with nodes each having same node-level
R=(Rregion U Rintra U Rinter)
Pdbn is priority of each node and R-factor of each relationship is Rf(intra), Rf(inter) and Rf(region)
Each DBN has three entities i.e.,
a. Rwt(inter)=Weight of inter-region relationship, single weight for one Isomorph
b. Rwt(region)=Weight of regional relationship, single weight for one region
c. Rwt(intra)=weight of intra-regional relationship, multiple weights i.e. Single value for each node inside this region.

Figure 5I:
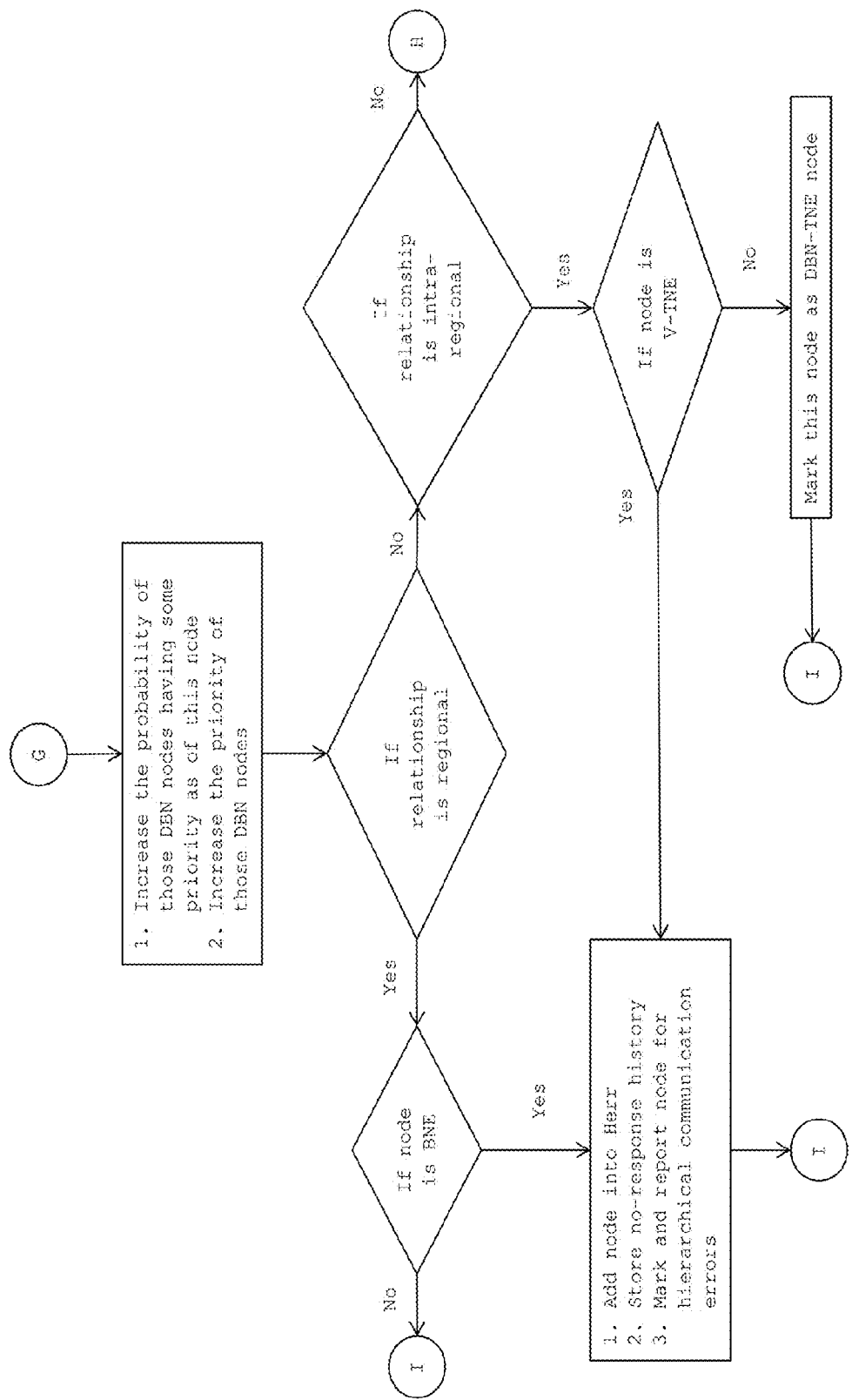

Further based on the calculated weight of each relationship-found, relationships are selected from highest weight to lowest. Further, nodes of each relationship are selected based on their priority from highest to lowest provided that specified DBN-node is not 'marked' (as shown in FIGS. 5G, 5H, 5I).

Figure 3:
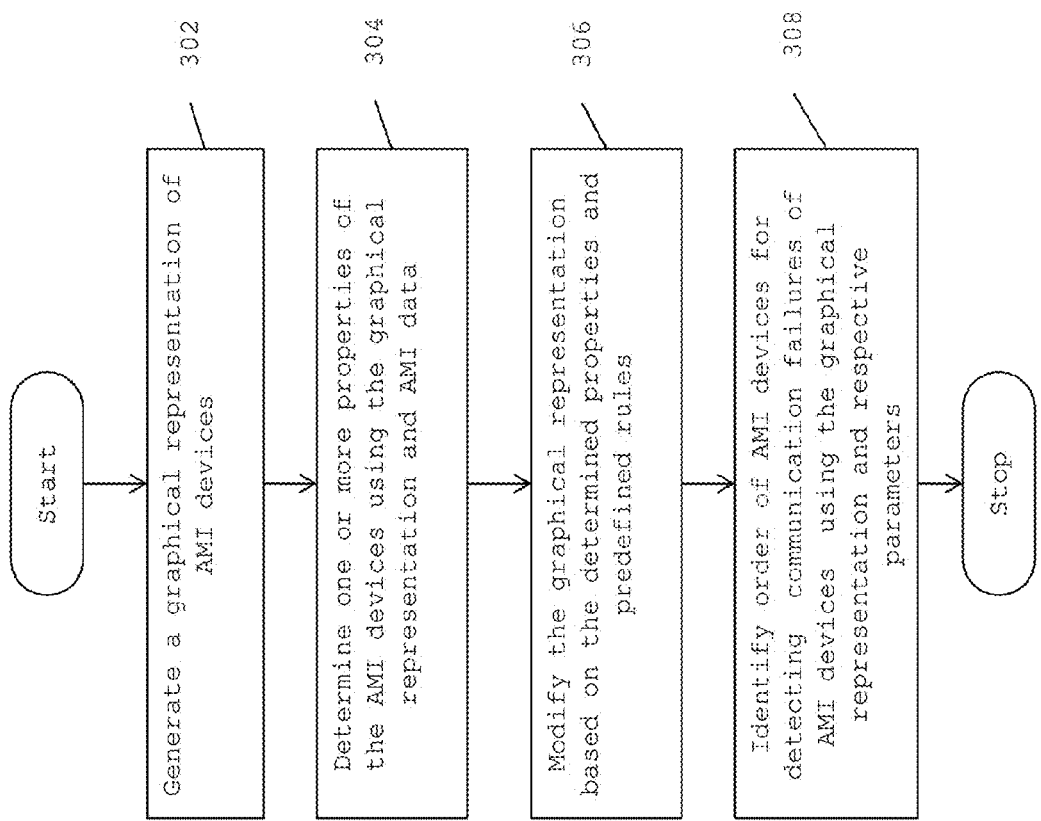
FIG. 3 is a flowchart of a method for optimized monitoring and identification of communication device failures, in accordance with an embodiment of the present invention.
Figure 4A:
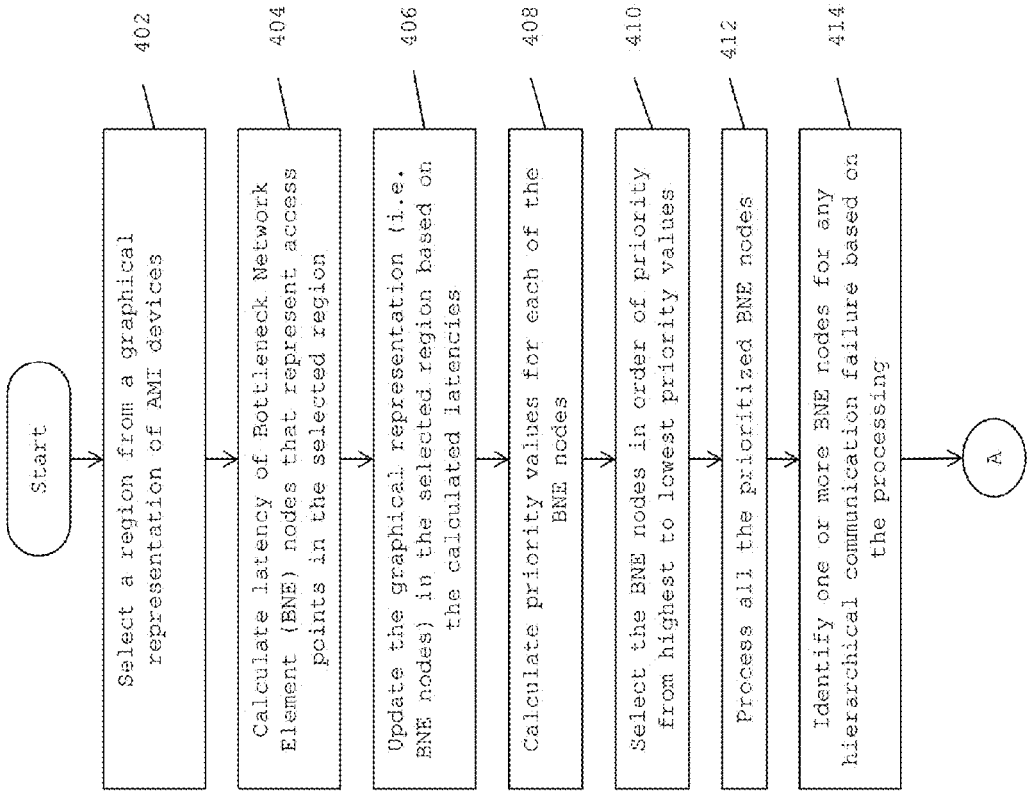
Figure 4B:
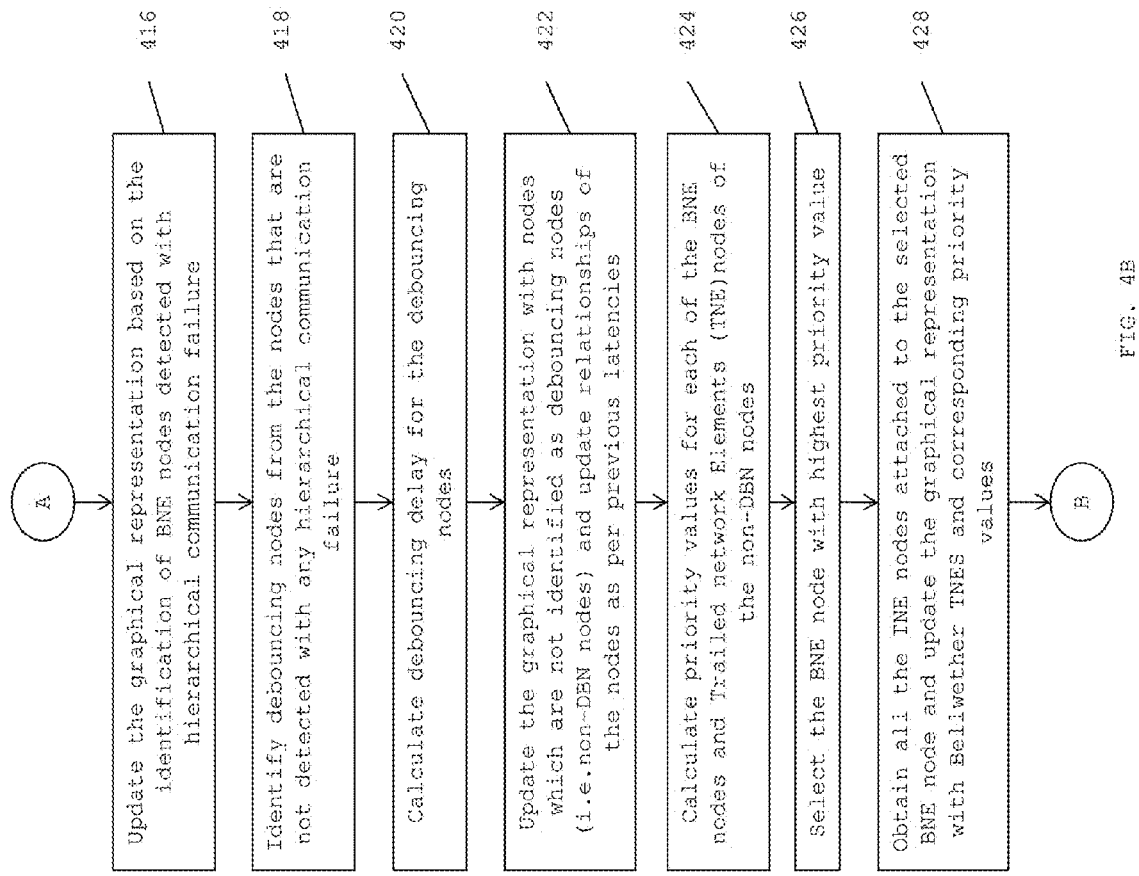
Figure 4C:
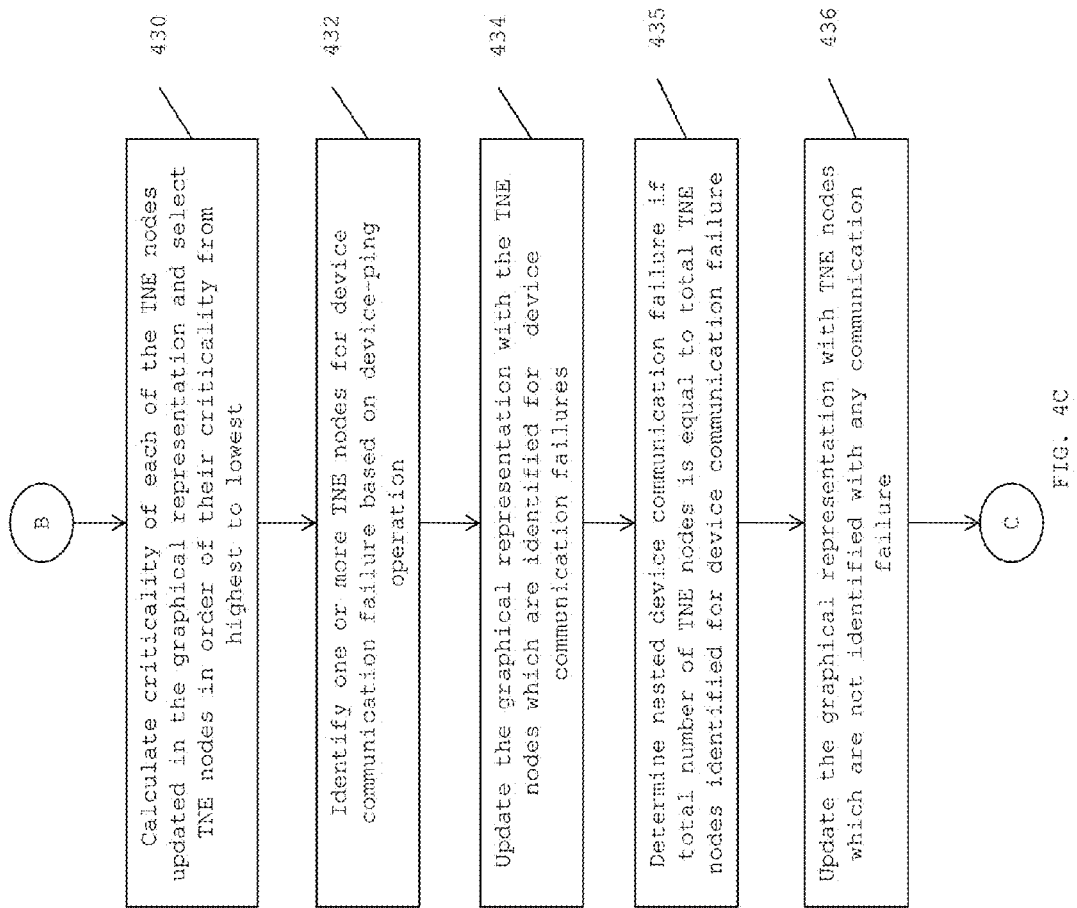

FIG. 3 is a flowchart of a method for optimized monitoring and identification of communication device failures, in accordance with an embodiment of the present invention.

At step 302, a graphical representation of AMI devices is generated. In an embodiment of the present invention, initially, the graphical representation is a directed graph comprising various nodes representing the AMI devices and various links representing the connectivity between the AMI devices. The access points are represented as nodes referred as Bottleneck-Network Element (BNE) node. The smart meters and relays are represented as nodes referred as Trailed Network Element (TNE) nodes. Further, nodes are created for multiple TNEs with root nodes representing relay and leaf nodes representing smart meters. These nodes are referred as Virtual-TNE nodes (V-TNE) nodes. In an embodiment of the present invention, any BNE or TNE node may be user specified Bellwether nodes which represent trend or state of certain group of the AMI devices. Any possible communication failure of the AMI devices can be identified based on data obtained by sending ping-requests to all those nodes prior to or after an actual failure of the AMI devices. In an exemplary embodiment of the present invention, programming languages such as C++, .Net may be used to create the graphical representation. The graphical representation generation is discussed in detail in conjunction with the system section.

At step 306, one or more properties of the AMI devices are determined using the graphical representation and AMI data. In an embodiment of the present invention, the one or more properties include BNE latencies, priority values and criticality. The process of determination of the one or more properties is discussed in conjunction with the system section.

At step 308, the graphical representation is modified based on the determined one or more properties and one or more predefined rules. As discussed in conjunction with the system section, in an embodiment of the present invention, the various graph nodes are modified in-real time based on the determined latency, priority values and criticality of the various nodes. Further, the links i.e. the graph edges between the various nodes are modified based on predefined rules for latency, and the priority values. Based on the predefined rules, for example, the modified graph edge is directed from node with less priority to node with high priority. Further, the modified graph edge is directed from node with higher latency to node with lower latency. The details have been discussed in conjunction with the system section.

At step 310, order of AMI devices is identified for detecting communication failures using the graphical representation and respective parameters. In an embodiment of the present invention, as discussed previously, based on the nodes represented in the graphical representation communication failures of the AMI device are identified in an optimized manner. As discussed in conjunction with the system section, firstly, the hierarchical communication failures i.e. communication failures at the level of BNE nodes representing the access points are detected. After communication failures at the level of BNE node are detected, the device communication failures along with nested device communication failures are detected i.e. communication failures at the level of TNEs representing the smart meters and relays which are attached to the BNE nodes.

FIGS. 4A, 4B, 4C, and 4D illustrate a flowchart of a method for optimized monitoring and identification of communication device failures, in accordance with another embodiment of the present invention.

At step 402, a region is selected from a graphical representation of AMI devices based on one or more parameters. In an embodiment of the present invention, the region is representation of a geographical area comprising of a particular set of access points, smart meters and relays in the AMI network. In an exemplary embodiment of the present invention, the region is selected in a sequential manner. In another exemplary embodiment of the present invention, the region is selected based on user defined priority.

At step 404, latency of Bottleneck Network Element (BNE) nodes that represent access points in the selected region is calculated. At step 406, the graphical representation (i.e. BNE nodes) is updated in the selected region based on the calculated latencies. At step 408, priority values for each of the BNE nodes are calculated. At step 410, the BNE nodes are selected in order of priority from highest to lowest. At step 412, all the selected BNE nodes as per prioritized order are processed. At step 414, one or more BNE nodes are identified for any hierarchical communication failures based on the processing. At step 416, the graphical representation is updated based on the identification of the BNE nodes detected with hierarchical communication failures. At step 418, debouncing nodes are identified from the nodes that are not detected with any hierarchical communication failure. At step 420, debouncing delay is calculated for the debouncing nodes. At step 422, the graphical representation (i.e. BNE nodes) is updated with nodes which are not identified as debouncing nodes (i.e. non-DBN nodes) and is further updated with relationships of the nodes as per previous latencies. At step 424, priority values for each of the BNE nodes and Trailed Network Elements (TNE) nodes (of the non-DBN nodes) that represent the smart meters and relays are calculated. At step 426, the BNE node with highest priority value is selected. At step 428, all the TNE nodes attached to the selected BNE node are obtained and the graphical representation is updated with Bellwether TNE nodes and corresponding priority values. At step 430, criticality of each of the TNE nodes updated in the graphical representation are calculated and TNE nodes are selected in order of their criticality from highest to lowest. At step 432, one or more TNE nodes are identified for device communication failure based on device-ping operation. At step 434, the graphical representation is updated with TNE nodes which are identified for device communication failures. At step 435, nested device communication failure is determined, if total number of TNE nodes is equal to total TNE nodes identified for device communication failure. At step 436, the graphical representation is updated with TNE nodes which are not identified with any communication failure. At step 438, the graphical representation is traversed to find Virtual Trailed Network Element (V-TNE) nodes that represent relay to smart meter relations. At step 440, the priority values of TNE nodes associated with the V-TNE nodes and Bellwether TNEs, if any are updated in the graphical representation. At step 442, criticality of each of the TNE nodes are calculated. At step 444, TNE nodes are selected in order of their criticality from highest to lowest. At step 446, one or more TNE nodes are identified for any device communication failure based on processing (i.e. Device-ping operations). At step 448, the graphical representation is updated with the TNE nodes which are identified with device communication failures. The details are discussed in conjunction with system section. In addition, FIGS. 5A, 5B, 5C, 5D, 5E, 5F, 5G, 5H, and 5I is an exemplary flowchart illustrating the abovementioned steps in detail.

FIG. 6 is an exemplary screenshot of a geo-location view of failed AMI devices detected, in accordance with an embodiment of the present invention.

FIG. 7 is an exemplary graph representing comparison of execution time for detecting communication failures in AMI devices as described in accordance with various embodiments of the present invention vis-a-vis conventional mass pinging method for detecting communication failures in AMI devices. As shown in FIG. 7, the execution time for detecting communication failures in AMI devices, as described in various embodiments of the present invention, is $O(\log(n))$ and the execution time as per conventional methods is $O(N)$, where n represents node relations and N represents total number of nodes. It will be apparent to a person of ordinary skill in the art from these figures that the execution time of the present invention is reduced as compared to the conventional methods and consequently the communication overhead is also reduced which in turn results in increase in efficiency.

FIG. 8 illustrates an exemplary computer system in which various embodiments of the present invention may be implemented.

The computer system 802 comprises a processor 804 and a memory 806. The processor 804 executes program instructions and may be a real processor. The processor 804 may also be a virtual processor. The computer system 802 is not intended to suggest any limitation as to scope of use or functionality of described embodiments. For example, the computer system 802 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 806 may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 810 may include, but not limited to, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, flash drives or any other medium which can be used to store information and can be accessed by the computer system 802. In various embodiments of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer-implemented method for optimized monitoring and identification of Advanced Metering Infrastructure (AMI) device communication failures in an AMI network via a processor executing program instructions stored in a memory, the computer-implemented method comprising:

generating, via the processor, a graphical representation of the AMI devices, the graphical representation comprising nodes corresponding to the AMI devices and links representing the connectivity between the AMI devices, wherein the graphical representation is generated based on data associated with the AMI devices retrieved via the AMI network in real-time;

computing, via the processor, one or more properties of the AMI devices using the graphical representation, wherein the one or more properties are computed based on values associated with the nodes corresponding to the AMI devices in the graphical representation;

modifying, via the processor, the graphical representation based on the computed one or more properties and one or more predefined rules, wherein the nodes corresponding to the AMI devices are updated based on the computed one or more properties and the one or more links are modified based on the one or more predefined rules;

selecting, via the processor, one or more nodes in the modified graphical representation and processing the selected nodes in an order based on AMI device hierarchy, priority and criticality;

modifying, via the processor, the graphical representation based on the processing of the selected nodes; and identifying AMI device with communication failures from at least one of the generated and modified graphical representation of the AMI devices.

2. The computer-implemented method of claim 1, wherein generating a graphical representation of the AMI devices comprises:

generating a directed graph including Bottleneck Network Element (BNE) nodes representing corresponding access points in the AMI network, Trailed Network Element (TNE) nodes representing smart meters and relays in the AMI network, and Virtual-Trailed Network Element nodes (V-TNE) representing the connection between smart meters and relays;

categorizing the generated nodes into a plurality of regions, wherein the plurality of regions represent the geographical area comprising the AMI devices; and characterizing each generated node of the region based on one or more parameters, wherein the one or more parameters comprise region code, predefined R-factor associated with each node-relationship, Type-Factor (T-Factor) related to the type of the AMI devices, and TOD-weight related to the time of operation of the AMI devices, and provisioned Bellwether nodes.

3. The computer-implemented method of claim 2, wherein computing one or more properties of the AMI devices using the graphical representation comprises:

generating an order to select BNE nodes from any selected region of the plurality of regions based on the one or more parameters;

obtaining latency values associated with the BNE nodes in the selected region, wherein the BNE nodes in the graphical representation are updated with latency values by analyzing pinging responses from the corresponding access points; and obtaining node-count values associated with the BNE nodes in the selected region, wherein the BNE nodes in the graphical representation are updated with node-count values which represent the number of TNE nodes that are attached to the BNE nodes.

4. The computer-implemented method of claim 3, wherein modifying the graphical representation based on the computed one or more properties and one or more predefined rules comprises: updating the links of BNE nodes of the generated graph based on the obtained latency values associated with the BNE nodes and the obtained node-count values.

5. The computer-implemented method of claim 4, wherein computing one or more properties of the AMI devices using the graphical representation comprises: computing priority values for each BNE node in the selected region based on at least the latency values and the node-count values.

6. The computer-implemented method of claim 5, wherein the priority values are computed for each BNE node in the selected region using the formula:

$$P(n)=((A-L)/A)+((T*pCnt)+(pCnt*h\text{constant}))+(T*ICnt)+(B/W)$$

where, A is average latency of all the BNE nodes, L is previous latency, T is T-factor of the BNE nodes, W is total number of Bellwether nodes, B is Bellwether flag, pCnt is total number of BNE nodes attached to B, and ICnt is total number of TNE nodes attached to B.

7. The computer-implemented method of claim 6, selecting one or more nodes in the modified graphical representation and processing the selected nodes in the order based on AMI device hierarchy, priority and criticality comprises:

selecting the order of BNE nodes in the selected region based on the BNE node priority values from the highest to the lowest; and categorizing the communication failure at BNE level as hierarchical communication failure.

8. The computer-implemented method of claim 7, wherein computing one or more properties of the AMI devices using the graphical representation further comprises:

obtaining the nodes that are not identified with hierarchical communication failure and identifying debouncing nodes from the obtained nodes, wherein the debouncing nodes are nodes with least probability of communication failure; and calculating debouncing delay for the debouncing nodes, wherein debouncing delay is the time-duration after which the debouncing nodes are pinged to check for any communication failure.

9. The computer-implemented method of claim 8, wherein the debouncing delay is calculated using the formula: Ddbn=[Thr(ToD(hcur))*60*60]/n(req).

10. The computer-implemented method of claim 9, wherein modifying the graphical representation based on the computed one or more properties and one or more predefined rules comprises updating the BNE nodes in the graphical representation based on the obtained nodes that are not identified with hierarchical communication failure and separating the updated BNE nodes from the identified debouncing nodes.

11. The computer-implemented method of claim 10, wherein computing one or more properties of the AMI devices using the graphical representation further comprises computing priority values for BNE nodes and TNE nodes not identified as debouncing nodes based on at least the latency values and the node-count values.

12. The computer-implemented method of claim 11, wherein the priority of each BNE nodes and TNE nodes is calculated using the formula: P=L/A+((T*pCnt)+(pCnt*hConstant))+(T*lCnt)+B/W where, A is average latency of all responding nodes, L is Previous latency, T is T-Factor of the BNE, B is Bellwether flag, Total number of Bellwether nodes in given region (W) and Total number BNEs (pCnt) and TNEs (lCnt).

13. The computer-implemented method of claim 11, wherein selecting nodes in the modified graphical representation and processing the selected nodes of the selected region for categorizing the nodes based on AMI device hierarchy, priority and criticality comprises:
 selecting the BNE nodes in order of their priority from highest priority to lowest priority;
 calculating criticality of the TNE nodes associated with the selected BNE nodes; and
 selecting the TNE nodes in order of their criticality from highest to lowest for identifying any AMI device communication failure.

14. The computer-implemented method of claim 13, further comprising: calculating critical factor (cf) of each TNE node using priority and average latency of each TNE node for past known hours using the following formula cf=(priority average node latency).

15. The computer-implemented methods of claim 13 further comprising:
 ascertaining nested device communication failure if all the TNE nodes are identified with device communication failure;
 traversing the graphical representation to identify all V-TNE nodes if the all the TNE nodes are not identified for device communication failure;
 updating priority values and Bellwether nodes for each node of the V-TNE nodes;
 modifying the graphical representation of V-TNE node for each of its node;
 calculating criticality of each node of the V-TNE node; and
 selecting the TNE nodes of selected V-TNE node in order of their criticality from highest criticality to lowest criticality for identifying any device communication failure.

16. The computer-implemented method of claims 12 and 13, wherein criticality of the TNE nodes of V-TNE nodes are calculated by obtaining network communication history of the TNE and V-TNE nodes for a predefined time period; computing latency based on pinging responses received from the TNE and V-TNE nodes; sorting the TNE and V-TNE nodes in an increasing order of computed latency, wherein the node with maximum average latency is identified as the node with highest criticality.

17. The computer-implemented method of claim 8, wherein debouncing nodes are identified by:
 calculating past network performance of the BNE nodes and the TNE nodes for predefined hours;
 calculating failure probability of the BNE nodes and the TNE nodes based on at least one of past iterations, number of device ping requests and number of failed ping-requests;
 calculating device-ping-rate-per-hour for the BNE nodes and the TNE nodes;
 calculating multiple-ping-probability of the BNE nodes and the TNE nodes; and
 identifying DBN nodes based on the calculated values.

18. The computer-implemented method of claim 17 further comprising:
 updating the graphical representation with debouncing nodes in order to determine if node should be pinged or not for the duration equal to debouncing-delay;
 obtaining node-relationships for each debouncing-nodes;
 calculating weight of each relationships;
 selecting the node-relationships in order of their weight from highest to lowest;
 selecting and processing each node of the node-relationship in order to detect any hierarchical, nested or device communication failure based on one or more parameter of the node; and
 updating one or more properties of the nodes in the graphical representation and sending next device-ping request after the time equal to debouncing delay.

19. The computer-implemented method of claim 18, wherein each of the node-relationship and corresponding weight is calculated by:
 obtaining regions codes of all debouncing nodes;
 generating sets of nodes sharing one or more common properties and one or more common parameters including region entity, region number, region name and node level; and
 calculating weight of each relationships as represented by regional, inter-regional and intra-regional relationship weight based on total number of debouncing nodes in a given node-relationships, priority of each debouncing node and R-factor of each relationship.

20. A system for optimized monitoring and identification of Advanced Metering Infrastructure (AMI) device communication failures in an AMI network for detecting communication failures, the system comprising:
 an AMI graph generating unit in communication with a processor and configured to generate a graphical representation of the AMI devices, the graphical representation comprising nodes corresponding to the AMI devices and links representing the connectivity between the AMI devices, wherein the graphical representation is generated based on data associated with the AMI devices retrieved via the AMI network in real-time;
 an AMI device monitoring unit in communication with the processor and configured to modify, via the AMI graph generating unit, the graphical representation based on computed one or more properties and one or more predefined rules associated with the nodes; and
 an AMI device communication failure identification unit in communication with the processor and configured to compute priority and criticality of the nodes using the modified graphical representation, wherein the nodes are categorized and processed based on AMI device hierarchy priority and criticality for detecting AMI device communication failures.

21. The system of claim 20 further comprising an AMI data repository in communication with the processor and configured to store data associated with the nodes that are computed using the graphical representation.

22. The system of claim 20 further comprising an AMI data retrieval unit in communication with the processor and configured to retrieve data associated with the AMI devices in the AMI network.

23. The system of claim 20, wherein the predefined rules comprise rules for modifying the links in the graphical representation between the nodes based on the computed one or more properties.

24. A computer program product comprising:
a non-transitory computer-readable medium having computer-readable program code stored thereon, the computer-readable program code having program instructions, when executed by a processor, cause the processor to:
generate a graphical representation of the AMI devices, the graphical representation comprising nodes corresponding to the AMI devices and links representing the connectivity between the AMI devices, wherein the graphical representation is generated based on data associated with the AMI devices retrieved via the AMI network in real-time;
compute one or more properties of the AMI devices using the graphical representation, wherein the one or more properties are computed based on values associated with the nodes corresponding to the AMI devices in the graphical representation;
modify the graphical representation based on the computed one or more properties and one or more predefined rules, wherein the nodes corresponding to the AMI devices are updated based on the computed one or more properties and the one or more links are modified based on the one or more predefined rules;
select one or more nodes in the modified graphical representation and process the selected one or more nodes in an order based on AMI device hierarchy, priority and criticality;
modify the graphical representation based on the processing of the selected nodes; and
identify AMI devices with communication failures from at least one of the generated and modified graphical representation of the AMI devices.

* * * * *